(12) United States Patent
Keller et al.

(10) Patent No.: US 9,413,561 B2
(45) Date of Patent: Aug. 9, 2016

(54) ROUTING TERMINATING CALLS

(75) Inventors: Ralf Keller, Würselen (DE); Afshin Abtin, Sollentuna (SE); Fredrik Lindholm, Stockholm (SE); David Castellanos Zamora, Stockholm (SE); Juan Manuel Fernandez Galmes, Getafe (ES); Antonio Alonso Alarcon, Getafe (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 393 days.

(21) Appl. No.: 13/981,533

(22) PCT Filed: Jun. 27, 2011

(86) PCT No.: PCT/EP2011/060746
§ 371 (c)(1),
(2), (4) Date: Jul. 24, 2013

(87) PCT Pub. No.: WO2012/110110
PCT Pub. Date: Aug. 23, 2012

(65) Prior Publication Data
US 2013/0308632 A1  Nov. 21, 2013

Related U.S. Application Data

(60) Provisional application No. 61/443,876, filed on Feb. 17, 2011.

(51) Int. Cl.
*H04L 12/66* (2006.01)
*H04W 76/02* (2009.01)
*H04L 29/06* (2006.01)

(52) U.S. Cl.
CPC ............ *H04L 12/66* (2013.01); *H04L 65/1069* (2013.01); *H04W 76/02* (2013.01)

(58) Field of Classification Search
CPC .... H04L 12/66; H04L 65/1069; H04W 76/02
USPC .............................. 370/352, 353, 35; 455/445
See application file for complete search history.

(56) References Cited

U.S. PATENT DOCUMENTS

2008/0039104 A1    2/2008  Gu et al.
2008/0186921 A1*   8/2008  Long et al. .............. H04W 8/12
                                                        370/331

OTHER PUBLICATIONS

International Search Report, PCT/EP2011/060746, Oct. 21, 2011.
(Continued)

*Primary Examiner* — Mark Rinehart
*Assistant Examiner* — Natali N Pascual Peguero
(74) *Attorney, Agent, or Firm* — Myers Bigel & Sibley, P.A.

(57) ABSTRACT

A subscriber server routes a terminating call in a network that includes a circuit switched (CS) network, a packet switched (PS) network, and an IP Multimedia Subsystem (IMS). The server receives a request for routing information in relation to the terminating call from a CS node in the CS network. A determination is made at server based on whether a UE associated with the terminating call is registered in the IMS and the UE has access to the PS network. The server instructs the CS node to route the terminating call in the CS network when the UE is not registered in the IMS or when the UE does not have access to the PS network. The server instructs the CS node to send the terminating call to the IMS for handling when the UE is registered in the IMS and when the UE has access to the PS network.

19 Claims, 16 Drawing Sheets

(56) References Cited

OTHER PUBLICATIONS

Written Opinion of the International Searching Authority, PCT PCT/EP2011/060746, Oct. 21, 2011.
3GPP TS 123.221 V9.4.0 (Jun. 2010); "Digital cellular telecommunications system (Phase 2+); University Mobile Telecommunications System (UMTS); LTE; Architectural requirements (Release 9)"; Technical Specification, European Telecommunications Standards Institute (ETSI), 650, Route des Lucioles; F-06921 Sophia-Antipolis; France, vol. 3GPP SA 2, No. V9.4.0, Jun. 1, 2010, XP014047178, pp. 1-49.
3GPP TS 123.292 V9.7.0 (Oct. 2010); "Digital cellular telecommunications system (Phase 2+); University Mobile Telecommunications System (UMTS); LTE; IP Multimedia Sybsystem (IMS) centralized services; Stage 2, (Release 9)"; Technical Specification, European Telecommunications Standards Institute (ETSI), 650, Route des Lucioles; F-06921 Sophia-Antipolis; France, vol. 3GPP SA 2, No. V9.7.0, Oct. 1, 2010, XP014061442, pp. 1-106.
3GPP TS 23.401 V9.4.0 (Mar. 2010); "3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 9)" 650, Route des Lucioles; F-06921 Sophia-Antipolis; France, pp. 1-258.
3GPP TS 23.228 V9.3.0 (Mar. 2010); "3$^{rd}$ Generation Partnership Project; Technical Specification Group Services and System Aspects; IP Multimedia Subsystem (IMS); Stage 2, (Release 9)" 650, Route des Lucioles; F-06921 Sophia-Antipolis; France, pp. 1-252.
3GPP TS 23.002 V8.3.0 (Sep. 2008); "3$^{rd}$ Generation Partnership Project; Technical Specification Group Services and Systems Aspects; Network architecture; (Release 8)" 650, Route des Lucioles; F-06921 Sophia-Antipolis; France, pp. 1-85.
3GPP TS 29.002 V12.1.0 (Jun. 2013); "3$^{rd}$ Generation Partnership Project; Technical Specification Group Core Network and Terminals; Mobile Application Part (MAP) specification; (Release 12)" 650, Route des Lucioles; F-06921 Sophia-Antipolis; France, pp. 1-1016.
3GPP TS 29.328 V12.1.0 (Jun. 2013); "3$^{rd}$ Generation Partnership Project; Technical Specification Group Core Network and Terminals; IP Multimedia (IM) Subsystem Sh interface; Signalling flows and message contents; (Release 12)" 650, Route des Lucioles; F-06921 Sophia-Antipolis; France, pp. 1-63.
Ericsson: "Consideration of the relationship between Domain Selection and Personal Network Management" 3GPP Draft; S2-070157, 3$^{rd}$ Generation Partnership Project (3gpp), Mobile Competence Centre; 650, Route des Lucioles; F-06921 Sophia-Antipolis cedex; France, vol. SA WG2, No. Florence; 20070109, Jan. 9, 2007, XP050258961, pp. 1-9.
China Mobile: "Scenario of the domain selection capability of HLR", 3GPP Draft; S2-103580__S2__80__Scenario of the Domain Selection Capability of HLR, 3$^{rd}$ Generation Partnership Project (3gpp), Mobile Competence Centre; 650, Route des Lucioles; F-06921 Sophia-Antipolis cedex; France, vol. SA WG2, No. Brunstad; 20100903, Aug. 24, 2010, XP050458609, pp. 1-3.

* cited by examiner

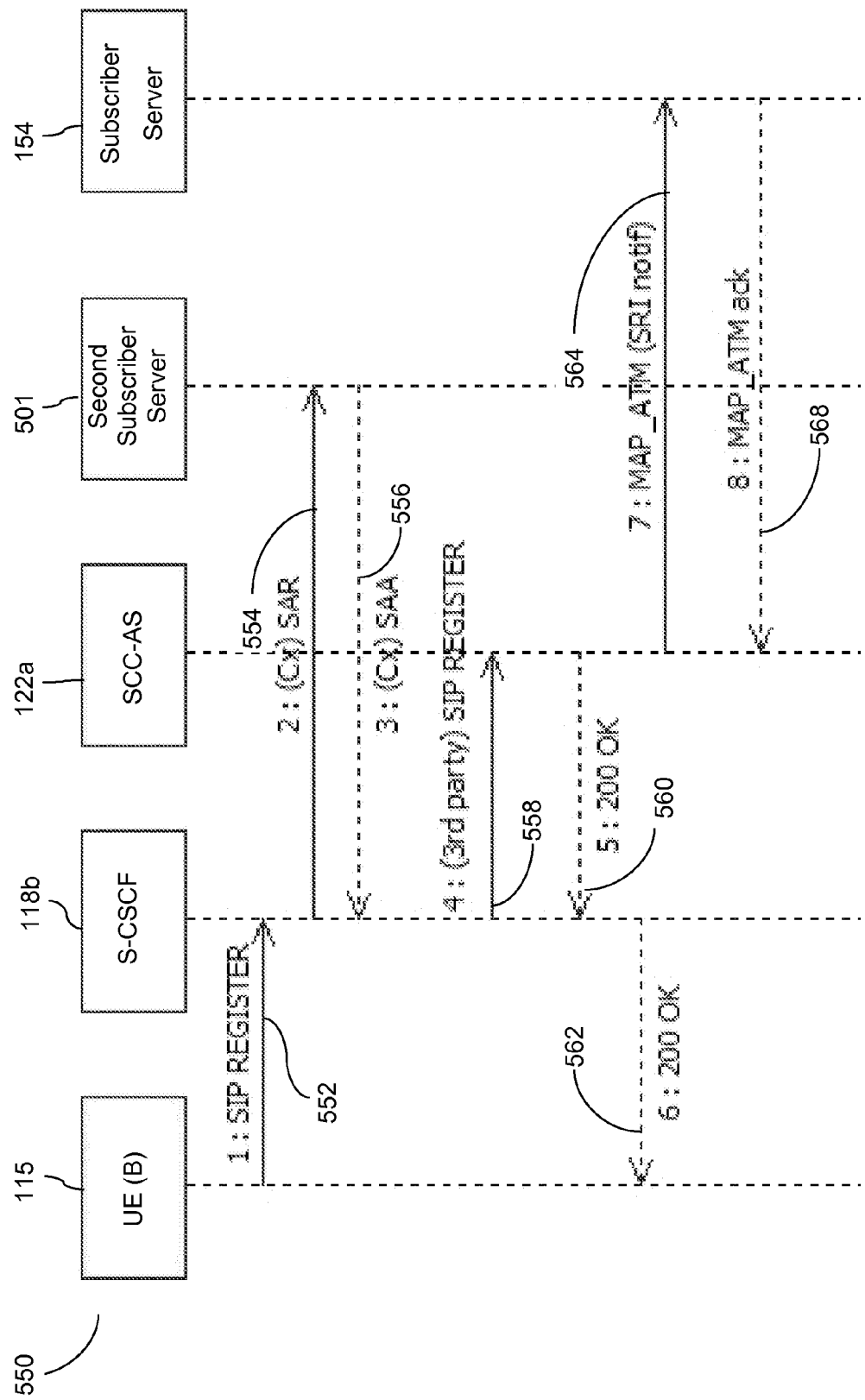

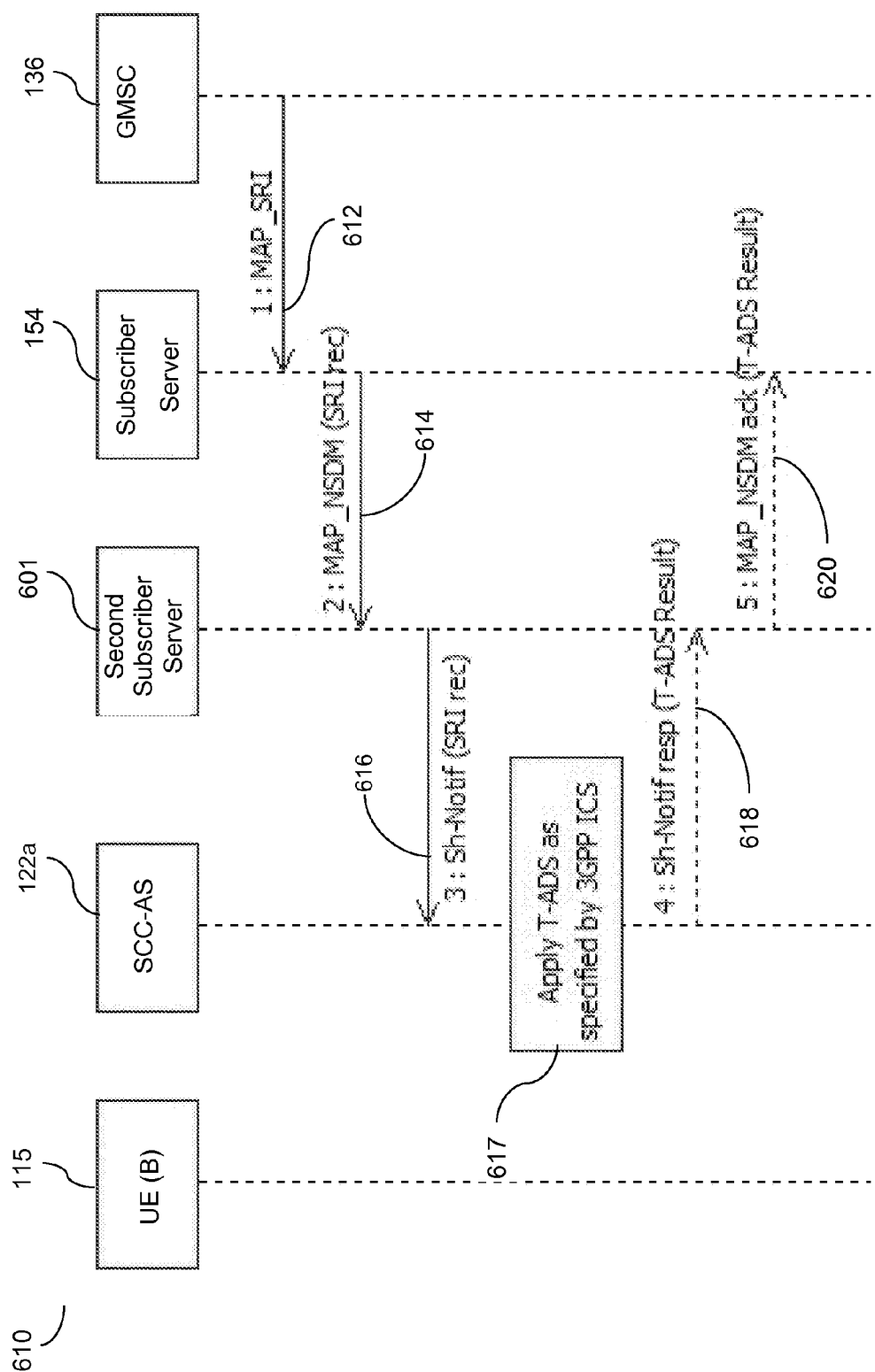

ROUTING TERMINATING CALLS

CROSS REFERENCE TO RELATED APPLICATION

This application is a 35 U.S.C. §371 national stage application of PCT International Application No. PCT/EP2011/060746, filed on 27 Jun. 2011, which itself claims the benefit of U.S. provisional Patent Application No. 61/443,876, filed 17 Feb. 2011, the disclosures and contents of both of which are incorporated by reference herein in their entirety. The above-referenced PCT International Application was published in the English language as International Publication No. WO 2012/110110 A1 on 23 Aug. 2012.

TECHNICAL FIELD

The present invention relates to methods and apparatus for routing a terminating call in a network. In particular, the invention relates to methods and apparatus for routing the terminating call in the network including a circuit switched (CS) network, a packet switched (PS) network and an IP multimedia subsystem (IMS) such that the network's call connection performance is optimised.

BACKGROUND

Radio communication systems and networks were originally developed primarily to provide voice services over CS networks. The CS networks only provide voice services as are considered to be legacy networks. PS networks may comprise or represent a communication network that groups all transmitted data into suitable sized data blocks called packets. Examples of specific PS networks that may be used in certain embodiments of the described network include, but are not limited to, legacy PS networks such as the second generation (2G), 2.5 generation (2.5G) and third generation (3G) networks, and/or evolved packet switched (EPS) networks, and/or all internet protocol (IP) based PS networks.

Legacy PS networks, for example, the so-called 2.5G and 3G networks, have enabled network operators to provide data services as well as voice services. However, network architectures are now evolving toward IP networks, which provide both voice and data services over a PS network. However, network operators have a substantial investment in existing CS and legacy PS network infrastructures and would, therefore, typically prefer a gradual migration to the IP network architectures. This will allow them to extract sufficient value from their current investments.

Migrating from existing CS and legacy PS networks to an all IP network will require a substantial investment in new network infrastructure to include the capabilities needed to support the next generation radio communication applications. Network operators can minimise this investment by deploying hybrid networks by re-using legacy network infrastructure and overlaying the next generation radio communication system and applications over it. For example, a next generation network could be overlaid onto an existing CS or legacy PS network in the transition to an all IP-based network. This allows networks to evolve from one generation to the next while providing backwards compatibility for legacy equipment.

The evolution to IP networks is evident, for example, the so-called Universal Mobile Telephone System (UMTS), is a legacy PS network commonly known as a 3G radio communication system, but has evolved into using enhanced PS network technologies such as High Speed Packet Access (HSPA) technology. In addition, air interface technologies within the UMTS framework have begun to evolve towards new air interface technologies defined in the so-called Long Term Evolution (LTE) and LTE-Advanced systems. Target performance goals for LTE systems include, for example, support for 200 active calls per 5 MHz cell and sub 5 ms latency for small IP packets.

The next generation radio communication systems and networks such as LTE and LTE-Advanced are considered to be all IP networks. These networks will have an upgraded PS network infrastructure called the evolved packet system (EPS). The EPS includes an evolved packet core (EPC) that forms the basis of the core PS network for the all IP network. These enhanced PS networks will provide all the mobile core functionality that, in the previous generations (2G, 2.5G, and 3G), has been realised through the existing CS networks and legacy PS networks. Each new generation, or partial generation, of a radio communication system and network needs further complexity and capabilities from existing systems, the demands of which are expected to increase with future enhancements to current systems before they are completely replaced.

As enhanced PS LTE systems are introduced, it is anticipated that they will need to interact with, for example, legacy CS and PS communication systems such as the 2/2.5G Global System for Mobile Communications (GSM) radio communication systems and the 3G UMTS radio communication systems, respectively. The 3rd Generation Partnership Project (3GPP) Technical Specification (TS) 23.292 is one of the 3GPP standards that describes the architectural requirements for delivery of consistent services to a user regardless of the attached access type such as access to CS networks or access to any of the current and future PS networks.

The IP Multimedia Subsystem (IMS) architecture or IMS was developed in order to, among other things, ease the migration from existing CS and PS based networks to the all IP networks. Based on the 3GPP standards, the IMS will serve the user as a single service engine in the new PS networks. These standards also describe IMS Centralized Services (ICS) where a user's services are migrated from a CS network to an IMS based network such as an all IP network based on LTE/LTE Advanced. This means that the IMS will have to handle all originating and terminating calls.

When a calling party (user A) places a call to a called party (user B) the call set-up process involves an originating call associated with user A and a terminating call associated with user B. The terms "originating call" and "terminating call" may comprise or represent the connection set-up signalling in relation to user A or user B between user equipment, respectively. Examples of originating or terminating calls that may be used in certain embodiments of the described network, include but are not limited to, the connection set-up signalling enabling a communication connection to be made between user A and user B in the two call halves model. The originating call is the connection set-up signalling for user A in the first call half and the terminating call is the connection set-up signalling for connecting the call with user B in the second call half.

The user equipment (UE) may comprise or represent any device used for communications. Examples of user equipment that may be used in certain embodiments of the described network are wireless devices such as mobile phones, terminals, smart phones, portable computing devices such as lap tops, handheld devices, tablets, netbooks, computers, personal digital assistants and other wireless communication devices, or wired communication devices such as telephones, computing devices such as desktop computers, set-top boxes, and other fixed communication devices.

FIGS. 1a and 1b illustrate a network 100 highlighting the evolution from existing CS networks, legacy PS networks, towards an IMS based IP network. FIG. 1a illustrates a generalized schematic of an evolved network 100 having an enhanced mobile switching center server (MSC-S) 116 in the CS network that is configured to communicate directly with nodes of the IMS 108. FIG. 1b illustrates a generalized schematic of a network 140 in which legacy nodes of the CS network like a non-enhanced mobile switching center (MSC) 134 communicates indirectly with the IMS 108 via other specialized IMS network nodes (detailed below).

Referring to FIG. 1a, the evolved network 100 illustrates various nodes associated with a serving Public Land Mobile Network (PLMN) 101 and a home PLMN 102. The serving PLMN includes a CS network 104, a PS network 105 including a legacy PS network 106 and an EPS network 107. The CS network 104 includes UE 114 in communication with some registrar nodes associated with the various access domains (or networks) such as the MSC-S 116 and Media Gateway (MGW) 118. The MSC-S 116 has IMS Centralized Services capabilities, meaning that it has the capability to register users or UEs such as UE 114 directly in the IMS 108. Since the MSC-S 116 and MGW 118 have IMS functionality, they can also be considered part of the IMS 108.

The term subscriber server may comprise or represent a user database that includes subscription-related information or subscriber profiles to assist call handling within a network or group of networks such as the CS, PS networks and/or IMS. Examples of subscriber servers that may be used in certain embodiments of the described networks are home subscriber servers (HSS) or home location registers (HLRs) that act as subscriber servers for existing CS networks, legacy PS networks, EPS networks, all IP networks, and/or the IMS. The 3GPP HSS includes functionality for acting as a subscriber server in the CS networks, legacy PS networks, EPS networks and IMS and performs authentication and authorization of the UE, and can provide information about the subscriber's location and IP information.

The home PLMN 102 includes some IMS architecture 108, a 3GPP HSS node 110 and a remote end 112 of the connection. The home PLMN 102 includes further registrar nodes in the IMS 108 associated with the various access domains (or networks) i.e. a call session control function (CSCF) 120 in the home PLMN 102. The CSCF 120 can include a proxy CSCF (P-CSCF) 120a, serving CSCF (S-CSCF) 120b and/or interrogating CSCF (I-CSCF) 120c (not shown). As can be seen, only a few of the relevant IMS nodes are shown in FIG. 1a. These include the CSCF 120, a Service Centralization and Continuity Application Server (SCC AS) 122a, which provides, among other functions, a Terminating-Access Domain Selection (T-ADS) function 122b. In FIG. 1a, the legacy PS network 106 includes a Serving GPRS Support Node (SGSN) 126, and the EPS network includes a Mobility Management Entity (MME) 124, both of which can communicate with the 3GPP HSS node 110 during, for example, the T-ADS function 122b.

In this example, UE 114 is an originating UE having access to the CS network 104 and is in communication via MSC-S 116 for setting up a call with another UE (not shown) in the remote end 112 of the connection. As the UE 114 is in the CS network 104, a terminating call (also known as a CS terminating call) associated with the UE in the remote end 112 is routed through MSC-S 116 to the IMS 108 via the CSCF 120. Omitted from the figure, among other things, are the access point nodes, e.g., eNodeBs. On receipt of the terminating call the IMS 108 triggers the SCC-AS 122a to perform the T-ADS function 122b for deciding the type of network, PS or CS network access, the terminating call can be routed to.

The T-ADS function 122b operates to, among other things, obtain access information related to:

(a) being aware of the currently used access type for a particular connection, i.e., PS or CS network access (for forwarding terminating calls to users and/or UEs), (b) checking for IMS voice over packet switched (VoPS) support and RAT (Radio Access Type) type in the serving (MME 124 and/or SGSN 126, and (c) querying, for all terminating calls for registered contacts (if registered via a PS network), the current serving nodes (via a subscriber server such as 3GPP HSS 110) for IMS VoPS support and RAT type.

The T-ADS function 122b obtains the aforementioned access information (VoPS support & RAT) via the reference point Sh. The 3GPP HSS 110 obtains this information via the reference points S6a from the EPS network 107 via MME 124 and/or from the legacy PS network 106 via Gr/S6d to SGSN 126.

The procedures performed by the T-ADS function 122b are further described in the 3GPP standards documents 3GPP TS 23.292, 23.221, 23.401. Conventionally, the procedures of the T-ADS function 122b are triggered by the SCC-AS 122a in IMS 108 based on an Sh query. This is the conventional T-ADS PS Support and RAT information retrieval when the network includes an MSC-S 116.

Referring to FIG. 1b, the network 140 is shown with a set of network nodes associated with a serving PLMN 130 and home PLMN 132 in which the CS network 104 has some legacy nodes. The same reference numerals used in FIG. 1a are reused in FIG. 1b identifying the same or similar network nodes. FIG. 1b illustrates schematically a conventional T-ADS PS Support and RAT information retrieval for a non-enhanced or a conventional (legacy) mobile switching centre (MSC) 134 in network 140. In FIG. 1b, the CS network 104 includes the MSC 134, which does not have the capability to register users or UEs in the IMS 108. Accordingly, and as an example, a terminating call from a call originating from UE 114 will be routed through MSC 134 and on to a gateway MSC (GMSC) 136. The GMSC 136 then routes the terminating call through protocol conversion entities media gateway control function (MGCF) 138 and MGW 118 in the control and media planes.

The 3GPP TS 23.221 standard sets out the steps for deciding the serving domain or network (e.g. CS network or PS network) for an originating and a terminating call. This is referred to as service domain selection (SDS). For example, the 3GPP standard 23.221 outlines which serving network, e.g. CS, PS network, or IMS, should serve a call arriving at a terminating GMSC (e.g. GMSC 136) in the CS network 104.

The 3GPP TS 23.292 standard describes the T-ADS function and requires that all terminating calls must first be handled by the IMS. This assumes that there is sufficient hardware/software present in the network to handle the required capacity demand resulting from handling all terminating calls in the IMS.

One scenario in which the CS/PS domain/network selection is foreseen to be an issue is when ICS is introduced in alignment with the start of voice over LTE (VoLTE). Multimedia Telephony Service (MMTel)/IMS will be the recommended service engine. This means that during early phases of IMS and VoLTE deployments, both VoLTE PS network access and CS network access will co-exist due to a lack of full LTE coverage. The users or UEs in such a network will be served by the CS network and the LTE based PS network, with the IMS being used as the service engine. For these scenarios, the call signaling related to calls originated in CS access and terminating calls are required to be routed to or handled by the IMS. This must occur even when the terminating user or UE, which is the called party, associated with the terminating call is on CS network access. All terminating calls will need to visit or be handled by the IMS to execute terminating services for the user (or subscriber) associated with the terminating call.

If the majority of the calls in a network are between users having CS network access, which will initially be the case in the migration to an all-IP based network, then the routing of or handling of all originating and terminating calls in the IMS will add severe connection delays until sufficient IMS hardware/software capacity has been deployed throughout the network. This means a substantial initial investment, which is not desirable. Therefore, there is a significant need to optimise the handling of originating and/or terminating calls in the network during the migration to minimise the connection delays caused by insufficient hardware/software capacity in the IMS.

SUMMARY

It is an object of the present invention to provide methods and apparatus of routing a terminating call within a network to minimise the delays introduced by sending all terminating calls to the IMS, thereby optimising network performance.

According to a first aspect of the invention, there is provided a method of routing a terminating call in a network. The network includes a CS network, a PS network, and an IMS. The method, which is performed by a subscriber server, includes the subscriber server receiving a request for routing information in relation to the terminating call from a CS node in the CS network. The subscriber server performs a determination as to whether a user's UE associated with the terminating call is registered in the IMS and whether the UE has access to the PS network. The subscriber server instructs the CS node to route the terminating call in the CS network when it has determined that the UE is not registered in the IMS or that the UE does not have access to the PS network. In addition to or alternatively, the subscriber server instructs the CS node to send the terminating call to the IMS for handling when it has determined that the UE is registered in the IMS and when the UE has access to the PS network.

The terminating call includes a connection set-up signalling associated with the user or UE. Only terminating calls that have to be handled by the IMS are sent to the IMS for further call handling. This minimizes the IMS call processing requirements and also the delays caused by the IMS handling terminating calls from the CS network that are then routed back within the CS network.

Optionally, when the user associated with the terminating call has multiple UEs within the same subscription in the IMS, the subscriber server is further configured to perform the step of determining, for each UE, to generate a first set of UEs to be served by the CS network and a second set of UEs to be served by the PS network. The subscriber server instructs the CS node to route the terminating call when there are one or more UEs in the first set of UEs. In addition to or alternatively, the subscriber server instructs the CS node to send the terminating call when there are one or more UEs in the second set of UEs.

This ensures only the terminating call will only be handled by the IMS in relation to only those UEs that have access to the PS network and are IMS registered. This further minimizes the IMS call processing requirements and also the possible delays caused by the IMS handling all terminating calls from the CS network that are then routed back within the CS network.

The subscriber server may be further configured to suppress, for the user associated with the terminating call, IMS call services that are incompatible with CS call services when both the first and second sets of UEs have at least one UE. This avoids conflicts in call services arising between the IMS and CS network, and hands responsibility to the CS network in relation to available call services.

Optionally, the subscriber server may determine whether the UE has access to the PS network only when the UE is IMS registered. This minimizes the time spent in determining whether the UE has access to the PS network when the UE may not be IMS registered and hence the subscriber server can instruct the CS node, for this UE, to route the terminating call within the CS network.

Optionally, the subscriber server may be configured to perform the step of determining whether the UE has access to the PS network by confirming that the current access type is PS access and that the UE has IMS voice over packet switched (VoPS) support. The step of determining may further include the subscriber server directly or indirectly querying one or more nodes of the PS network for access information associated with the current access type and IMS VoPS support.

In addition, the subscriber server may be configured to query the one or more nodes of the PS network by triggering a second subscriber server in the network to query the one or more nodes of the PS network, and to receive the access information sent from the second subscriber server. The second subscriber server may include the functionality related to one or more specific functions of a 3GPP compliant subscriber server. In addition, querying one or more nodes of the PS network further comprises performing a T-ADS function to retrieve the access information. Optionally, querying one or more nodes of the PS network includes querying one or more nodes of the PS network having the functionality of a mobility management entity or serving GPRS support node.

Alternatively, querying the one or more nodes of the PS network is performed by triggering an IMS node to query the one or more nodes of the PS network. The IMS node may include the functionality of a SCC-AS. The access information is received at the subscriber server from the IMS node. Optionally, the subscriber server may receive the access information from the IMS node via the second subscriber server.

In addition, the subscriber server may be configured to receive a request, sent from the IMS node, for information associated with the UE's current access to the packet switched network, and the subscriber server retrieves and transmits the information towards the IMS node. This allows the IMS node to perform a network query to the subscriber server to retrieve the access information instead of performing a T-ADS function, which may be more time consuming and unnecessary as the subscriber server is assumed to have had this function performed already.

Optionally, the subscriber server is configured to receive, from the IMS, IMS status information associated with the UE when the UE registers within the IMS, and to use the received IMS status information when determining whether the UE is IMS registered. This provides the advantage that the subscriber server will have ready access to the IMS status information will not need to perform a network query to determine this information. Additionally, the subscriber server may receive the IMS status information from a second IMS node including the functionality of an SCC-AS node or from a third subscriber server including the functionality related to one or more specific functions of a 3GPP compliant subscriber server.

In addition, the subscriber server may include in the instructions to the CS node a mobile station roaming number (MSRN) for use by the CS node to immediately recognize that the call should and can be routed om the CS network. Alternatively, an IP Multimedia Routing Number (IMRN) is included in the instructions to the CS node when it is determined that the terminating call should be handled by the IMS.

In a second aspect of the invention, there is provided a method for a CS node in the CS network for use in routing a terminating call in the network. The CS node is configured for receiving the terminating call associated with a UE and transmitting a request for routing information (to a subscriber server in relation to the terminating call. The CS node is further configured for receiving a first instruction from the subscriber server to route the terminating call in the CS network when the UE is not registered in the IMS or when the UE does not have access to the PS network. In response, the CS node routes the terminating call in the CS network. In addition to or alternatively, the CS node is configured for receiving a second instruction from the subscriber server to send the terminating call to the IMS for handling when the UE is registered in the IMS and when the UE has access to the PS network. In response, the CS node sends a notification to the IMS to handle the terminating call.

Optionally, when the user associated with the terminating call has multiple UEs within the same subscription in the IMS (108), the CS node is further configured for receiving the first instruction and route the terminating call in the CS network when one or more of the UEs are not registered in the IMS (108) or when one or more of the UEs associated with the terminating call do not have access to the PS network. The CS node is further configured for receiving a second instruction and sending the notification to the IMS for handling the terminating call is performed when one or more of the UEs are registered in the IMS and these UEs have access to the PS network.

In addition, the CS node is further configured for detecting which UE first answers the terminating call and instructing the CS network or the PS network, via the IMS, to cancel the terminating call for the other UEs. This prevents multiple UEs from being unnecessarily contacted and further minimises the load on the network. In addition, the CS node is further configured to instruct the IMS or the subscriber server which call services of the UE associated with the terminating call will be executed by the CS node.

In another aspect of the invention, there is provided a network node for routing a terminating call in the network. The network node includes a receiver, a transmitter, a memory unit, and processing logic. The processing logic is connected to the receiver, to the transmitter, and to the memory unit. The receiver is configured for receiving a request for routing information in relation to the terminating call from a CS node in the CS network. The processing logic includes determining logic to determine whether a UE associated with the terminating call is registered in the IMS and whether the UE has access to the PS network. The transmitter is configured for sending a first instruction to the CS node for routing the terminating call in the CS network when the UE is not registered in the IMS or when the UE does not have access to the PS network. In addition to or alternatively, the transmitter is further configured for sending a second instruction to the CS node for sending the terminating call to the IMS for handling when the UE is registered in the IMS and when the UE has access to the PS network.

Optionally, the network node further includes, when the user associated with the terminating call has multiple UEs within the same subscription in the IMS, the determining logic to be arranged to determine, for each UE, whether the UE is IMS registered or has access to the PS network and to generate a first set of UEs to be served by the CS network and a second set of UEs to be served by the PS network. The transmitter is configured to send the first instruction to the CS node only when there are one or more UEs in the first set of UEs. In addition or alternatively, the transmitter is configured to send the second instruction to the CS node when there are one or more UEs in the second set of UEs.

In another aspect of the invention, there is provided a CS node for routing a terminating call in the network. The CS node includes a receiver, a transmitter, a memory unit, and processing logic. The processing logic is connected to the receiver, to the transmitter, and to the memory unit. The receiver is configured for receiving the terminating call associated with a UE. The transmitter is configured for transmitting a request for routing information to a subscriber server in relation to the terminating call. The receiver is further configured for receiving a first instruction from the subscriber server to route the terminating call in the CS network when the UE is not registered in the IMS or when the UE does not have access to the PS network. The processing logic includes routing logic configured for routing the terminating call within the CS network, via the transmitter, in response to the first instruction. The receiver is further configured to receive a second instruction from the subscriber server to send the terminating call to the IMS for handling when the UE is registered in the IMS and when the UE has access to the PS network. The routing logic is configured for sending, via the transmitter, a notification to the IMS to handle the terminating call in response to the second instruction.

Optionally, the CS node includes, when the user associated with the terminating call has multiple UEs within the same subscription in the IMS, the routing logic being configured to only route the terminating call in the CS network when one or more of the UEs are not registered in the IMS or when one or more of the UEs associated with the terminating call does not have access to the PS network. The routing logic is configured to only send the notification when one or more of the UEs are registered in the IMS and these UEs have access to the PS network.

In addition, the processing logic is further configured to detect which UE first answers the terminating call, and the processing logic is further configured to send, via the transmitter, an instruction to cancel the terminating call for the other UEs in the CS network and/or the PS network via the IMS.

BRIEF DESCRIPTION OF THE DRAWINGS

In order that the invention may be more fully understood, some of the embodiments of the invention will now be described, by way of example only, with reference to the accompanying drawings, in which:

FIG. 5c is signal flow diagram illustrating a further IMS user registration process for use in the process according to embodiments of the invention;

FIG. 6b is a signal flow diagram illustrating another process for triggering a T-ADS function for use in the process according to embodiments of the invention;

DETAILED DESCRIPTION

The following detailed description of the exemplary embodiments refers to the accompanying drawings. The same reference numbers in different drawings identify the same or similar elements. Also, the following detailed description does not limit the invention. The following embodiments are discussed, for simplicity, with regard to the terminology and structure of exemplary systems. However, the embodiments to be discussed next are not limited to such exemplary systems but may be applied to other telecommunications systems.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

In order to at least partially overcome the problems described above, the exemplary embodiments proposed herein improve the performance of a network by performing a service domain selection, in particular a T-ADS function, prior to a terminating call being sent to the IMS for call handling. This results in the terminating network associated with the terminating call is selected without requiring the IMS to handle all terminating calls. This provides the advantage of minimising or, in some cases, eliminating delays introduced by having all terminating and originating calls being routed to the IMS for call handling. The exemplary embodiments avoid the scenario in which a terminating call associated with a UE that only has access to the CS network is sent to the IMS for call handling. Exemplary embodiments will allow terminating calls to be handled by the IMS if the UE associated with the terminating call has access or IMS VoPS to the PS network.

Figure 1A:
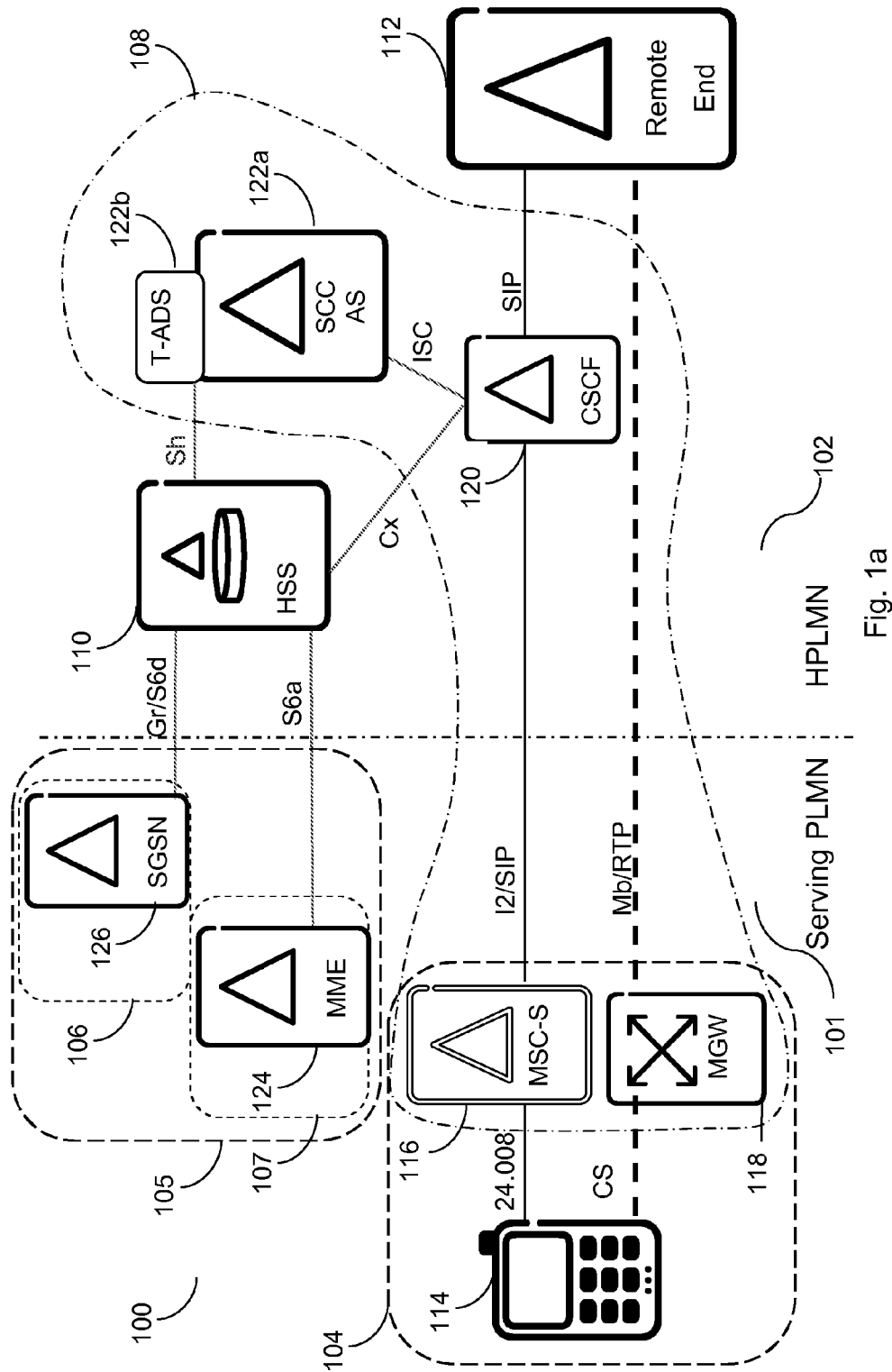
FIG. 1*a* is a schematic illustration of an evolved network architecture that includes an enhanced Mobile Switching Center (MSC)
Figure 1B:
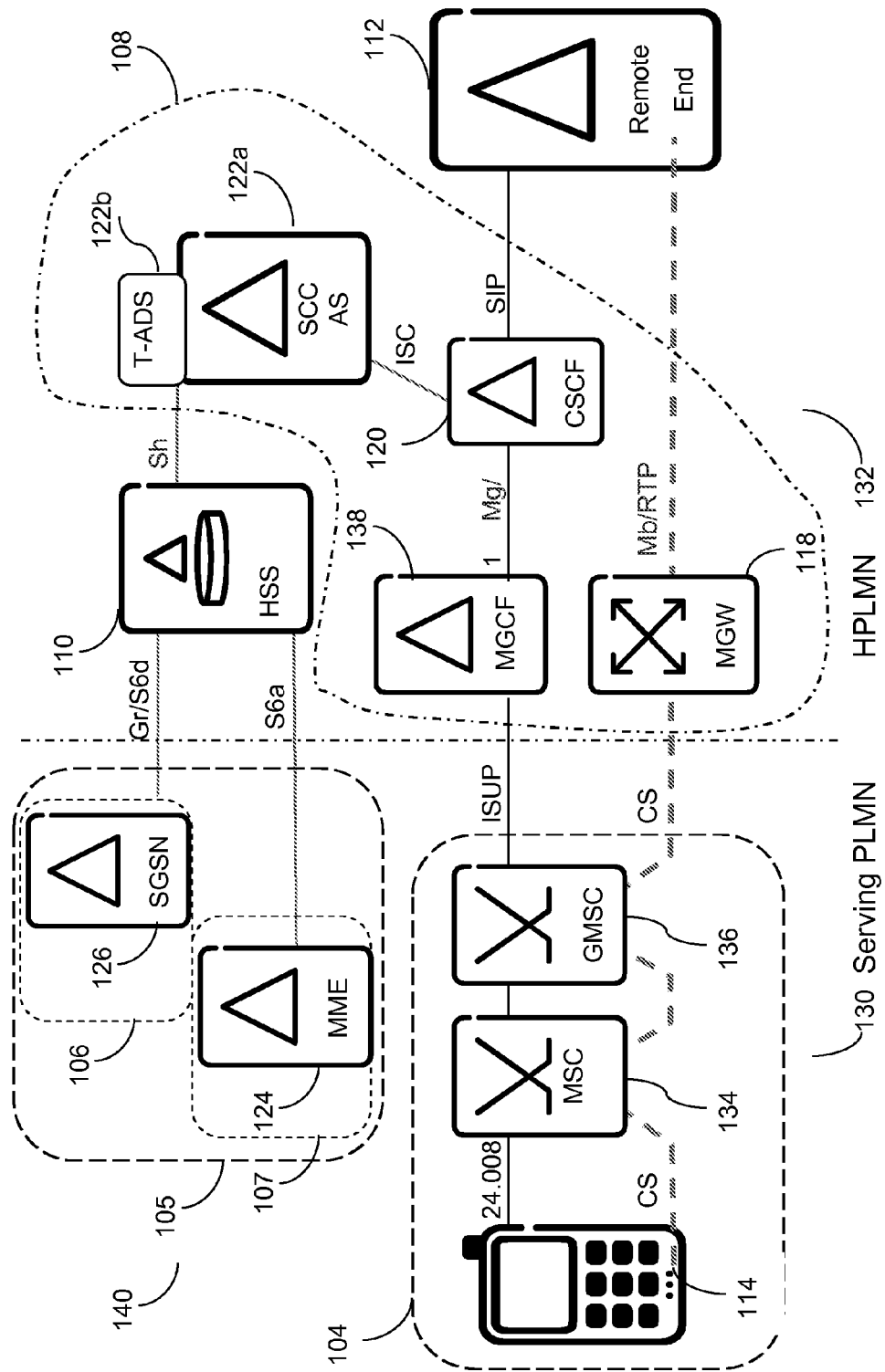
FIG. 1*b* is a schematic illustration of a network architecture that includes a non-enhanced Mobile Switching Center (MSC)

In essence, according to the exemplary embodiments, for terminating calls reaching the GMSC 136, a subscriber server is configured to perform an enhanced SDS combined with the T-ADS function 122. This avoids routing the CS terminating call to the IMS 108 and having the T-ADS function 122 being triggered by the SCC-AS 120. For example, if the user is not registered in the IMS 108, or if the user is registered in the JMS 108 but does not currently have VoIP capable access, the call will not be routed to or handled by the IMS 108. In the example of FIGS. 1a and 1b, the subscriber server is the 3GPP HSS 110. The subscriber server 110 can be configured to perform an IMS registration check and a network assisted TADS function to obtain the user's current access and its VoPS (or voice over IP (VoIP)) capability by query to the MME 124 and/or SGSN 126

The advantages of the invention provide that originated calls from the CS network 104 are not forced into IMS 108 and terminating calls that reach an operator's GMSC are not routed or handled by IMS 108 unless, for example, the user is IMS registered and currently on a VoIP capable PS access. Embodiments of the invention can be implemented as a dual service engine where, for an equal sub-set of supplementary services, both the CS network and the IMS are provisioned with the necessary data and are synchronized with one another.

Figure 1C:
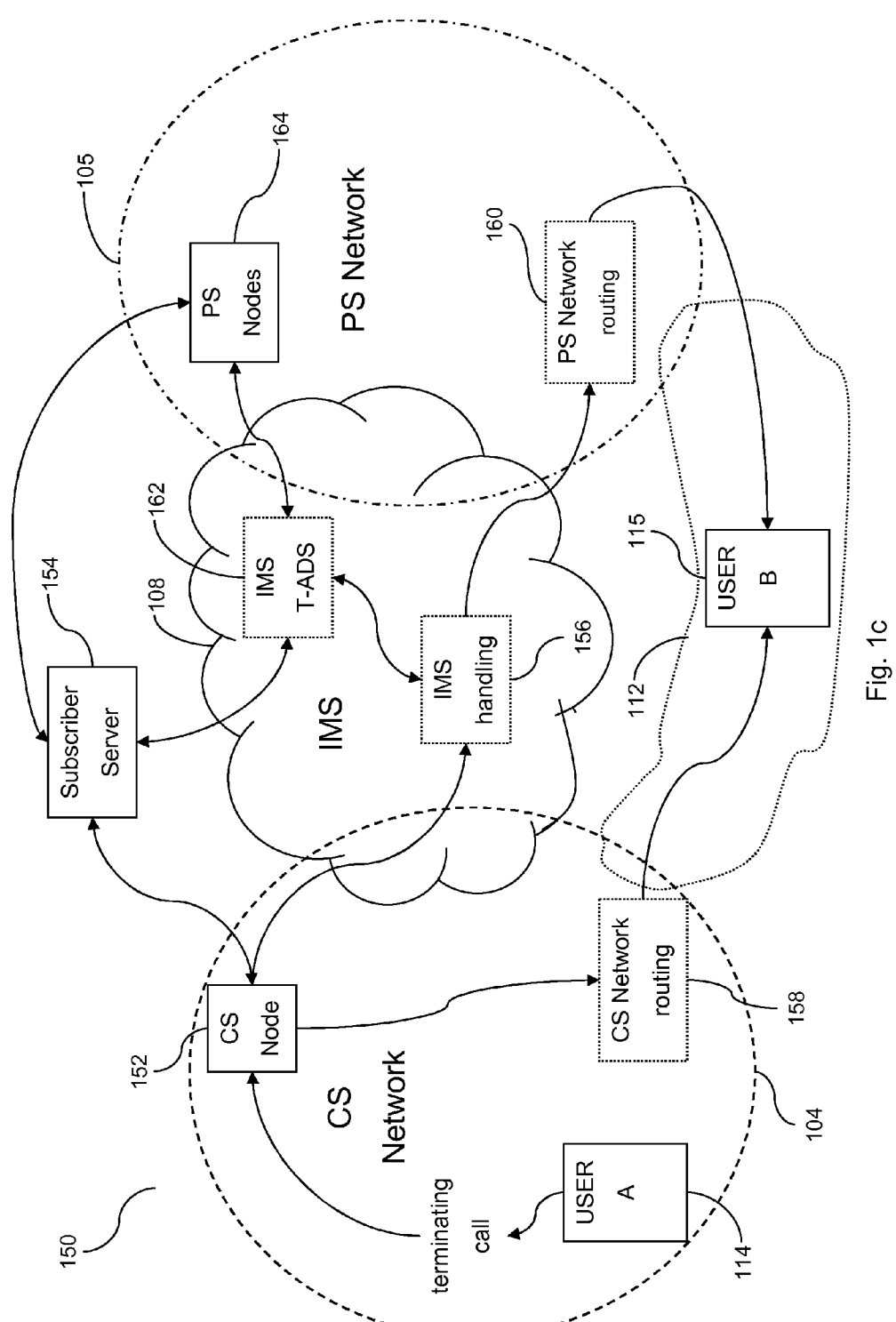
FIG. 1*c* is a schematic illustration of a network for illustrating embodiments of the invention.

FIG. 1c is another generalised schematic illustration of a network 150 illustrating the communication paths for performing an enhanced SDS to route a terminating call according to embodiments of the invention. The same reference numerals used in FIGS. 1a and 1b are reused in FIG. 1c identifying the same or similar network nodes.

Referring to FIG. 1c, the network 150 includes a CS network 104, a PS network 105 and an IMS 108. The CS network 104 includes UE 114, which is the calling party. UE 114 places a call within CS network 104 to UE 115 in the remote end 112, which is the called party. The UE 115 in the remote end may have CS and/or PS access to CS network 104 and/or PS network 105, respectively. The CS network 104 generates the connection set-up signalling for connecting the call from UE 114 to UE 115, a terminating call, which includes the connection set-up signalling associated with UE 115, is generated by the CS network 104. The terminating call is received by a CS node 152 in CS network 104. The CS node 152 may include the functionality of a GMSC 136, such that it needs to determine how to route the terminating call to enable the call to be connected to UE 115.

As this network 150 includes a CS network 104, a PS network 105, and an IMS 108, the UE 115 in remote end 112 could have the capability of accessing both the CS and PS networks 104 and 105. This means the CS node 152 needs to query a subscriber server 154 to determine how to route the terminating call. On receiving the terminating call associated with UE 115, the CS node 152 transmits a request for routing information to subscriber server 154 in relation to the terminating call. The CS node 152 then waits for a response from subscriber server 154.

The subscriber server 154 on receiving the request for routing information in relation to the terminating call from CS node 152 performs an enhanced service domain selection function for routing the terminating call according to embodiments of the invention. In this regard, the subscriber server 154 includes functionality for determining whether UE 115 associated with the terminating call is registered in the IMS 108 and whether UE 115 has access to the PS network 105. Once this information is determined, subscriber server 154 sends a first instruction to instruct the CS node 152 to route the terminating call in the CS network 104 when it has determined that UE 115 is not registered in the IMS or when UE 115 does not have access to the PS network 105. This means that UE 115 will use CS access when the call from UE 114 is connected. Alternatively, subscriber server 154 sends a second instruction to instruct the CS node 152 to send the terminating call to the IMS 108 for handling, i.e. by IMS handling nodes 156, when the UE 115 is registered in the IMS 108 and when the UE 115 has access to the PS network 105.

When CS node 152 receives the first instruction from the subscriber server 154, this means that UE 115 does not have access to the PS network 105 or is not IMS registered, the CS node 152, in response to the first instruction, routes the terminating call in the CS network 104. Various nodes in the CS network 104 perform CS network routing 158 or call connection to connect the call between UE 114 and UE 115.

When CS node 160 receives the second instruction from the subscriber server 160, this means that UE 115 is IMS registered and has access to the PS network 156, the CS node 152, in response to the second instruction, sends a notification to IMS 108 for IMS handling 156 of the terminating call. For example, various nodes in the IMS 108 such as MGW or MGCF nodes, can receive the notification from CS node 152 and then proceed to handle the terminating call. However, since it has already been determined by subscriber server 154 that the UE 115 has access to PS network 105, the inevitable result is that the IMS handling 156 will send the terminating call to PS network 105 in which PS network routing 160 connects the call from UE 114 with UE 115 via PS network 105. PS network routing 160 includes all the necessary PS nodes to use the terminating call in connecting the call between UE 114 and UE 115.

The first instruction may include a mobile station roaming number (MSRN), which allows the CS node 152 to immediately identify that the terminating call should be routed within the CS network 104. The second instruction may include an IP Multimedia Routing Number (IMRN), which allows the CS node 152 to immediately identify that the terminating call should be sent to the IMS 108 for IMS handling 156.

The IMS handling 156 may require a T-ADS function to be performed to determine the networks that the UE 115 has access to. IMS handling 156 can query IMS T-ADS 162 for the required access information as to whether UE 115 has access to the PS network 105. The required access information includes information associated with whether the current access type of UE 115 is PS access and that the UE 115 has IMS VoPS support.

IMS T-ADS 162 includes IMS nodes such as an SCC-AS node, which has the functionality to perform a T-ADS function to retrieve the required access information from the PS network 105. This is performed by querying the required PS nodes 164 in the PS network 105. Some of the PS nodes in the PS network 105 may include MME 124 in an EPS network 107 and/or an SGSN 126 in a legacy PS network 106.

Alternatively, it may be that this information is stored in subscriber server 154, in which case, the IMS T-ADS 162 may instead send a network query to subscriber server 154 to retrieve the required access information. Once IMS handling 156 has the required access information it can determine whether UE 115 has access to the PS network 105 and based on this information it can route or send the terminating call to the appropriate network (i.e. CS or PS network).

Several ways in which subscriber server 154 can determine whether UE 115 associated with the terminating call is registered in the IMS 108 are now described. If the subscriber server 154 does not have the information that UE 115 is registered in IMS 108, it could query IMS 108 to retrieve this information. The subscriber server 154 can also be configured to obtain this information from IMS 108 by either a data push or pull process when UE 115 registers with the IMS 108.

The IMS registration information of UE 115 can be pushed from the IMS 108 to subscriber server 154 when UE 115 registers with the IMS 108. This means that the subscriber server 154 will receive a data packet or a message, from the IMS 108, including IMS status information associated with UE 115. In particular, the IMS status information can be pushed or sent to subscriber server 154 from an IMS node having the functionality of an SCC-AS node. Alternatively, the IMS status information can be pushed to subscriber server 154 from a third subscriber server (not shown) that includes the functionality related to one or more specific functions of a 3GPP compliant subscriber server. The subscriber server 154 stores the received IMS status information associated with UE 115 for use in confirming that UE 115 is IMS registered.

The subscriber server 154 can also have functionality for determining whether UE 115 associated with the terminating call has access to PS network 105. This can be determined only when the subscriber server 154 has determined that UE 115 is IMS registered, which streamlines the procedure. This is because if UE 115 is not IMS registered, then it is unnecessary to determine if UE 115 has access to the PS network 105.

One way of determining whether UE 115 has access to the PS network 105 includes confirming from a database (or stored information) on subscriber server 154 that the current access type of UE 115 is PS access and that the UE 115 has IMS VoPS support. However, if this information is not readily available, the subscriber server 154 can include the functionality to query one or more PS nodes 164 of PS network 105 for access information associated with the current access type and IMS VoPS support. The PS network 105 may include an EPS network 107 such that the PS nodes of the PS network 105 have the functionality of an MME 124. The PS network 105 may also include a legacy PS network 106 such that the PS nodes 164 of the PS network 105 have the functionality of an SGSN 126. The query may include performing a T-ADS function to retrieve the access information.

Alternatively, the subscriber server 154 could trigger a second subscriber server (not shown) in the network 150 to query the one or more PS nodes 164 or perform a T-ADS function on behalf of subscriber server 154. Subscriber server 154 would then receive the access information from the second subscriber server. The second subscriber server may include the functionality related to one or more specific functions of a 3GPP compliant subscriber server, such that it can query the one or more PS nodes 164 or it may already have stored the required access information in relation to UE 115 such that it can immediately send the required information to subscriber server 154.

The subscriber server 154 may also include the functionality to retrieve the access information from IMS 108. This can be achieved by the subscriber server 154 triggering an IMS node (not shown) to query the one or more PS nodes 164 of the PS network 105. For example an IMS node in IMS T-ADS 162 can be triggered to perform a T-ADS function. In any event, the IMS node includes the functionality of an SCC-AS node. The IMS node then sends the required access information to subscriber server 154.

In the case when user B of UE 115 associated with the terminating call has multiple UEs within the same subscription in the IMS 108, then subscriber server 154 needs to determine, for each UE of user B, the IMS registration status of that UE and whether that UE has access to the PS network 105. Subscriber server 154 can generate a first set or list of UEs that can only be served by the CS network 104 and a second set or list of UEs that can only be served by the PS network 105. The subscriber server 154 sends the first instruction to CS node 152 when there are one or more UEs in the first set of UEs. The subscriber server 154 also sends a second instruction to CS node 152 when there are one or more UEs in the second set of UEs. This means that the terminating call is routed or handled by both the IMS 108 and the CS network 104 if there is at least one UE in each set of UEs. This may cause unusual service issues (described below with respect to FIG. 3b) between the services provided by the IMS 108 and the services provided by the CS network 104. To alleviate these issues, the subscriber server 154 could suppress, for the UE 115 associated with the terminating call, IMS call services that are incompatible with CS call services when both the first and second sets UEs have at least one UE.

The CS node 152 requires a response to the request for routing information from subscriber server 154. In the multiple UEs case, the CS node 152 can receive the first instruction and so routes the terminating call in the CS network 104 when one or more of the UEs are not registered in the IMS 108 or when one or more of the UEs associated with the terminating call do not have access to the PS network 105. In addition, the CS node 152 may also receive the second instruction and, in response, send the notification to the IMS 108 for handling the terminating call when one or more of the UEs associated with user B are registered in the IMS 108 and these UEs have access to the PS network 105. In order to prevent unusual service issues when the terminating call has been routed to two networks, e.g. call forwarding issues, the CS node 152 detects or determines which UE first answers the terminating call and then instructs the CS network 104, or the PS network 105, via the IMS 108, to cancel the terminating call for all the other UEs. The CS node 152 also includes the functionality to instruct the IMS 108 or the subscriber server 154 which call services of the UE 115 associated with the terminating call will be executed by CS node 152.

Figure 2A:
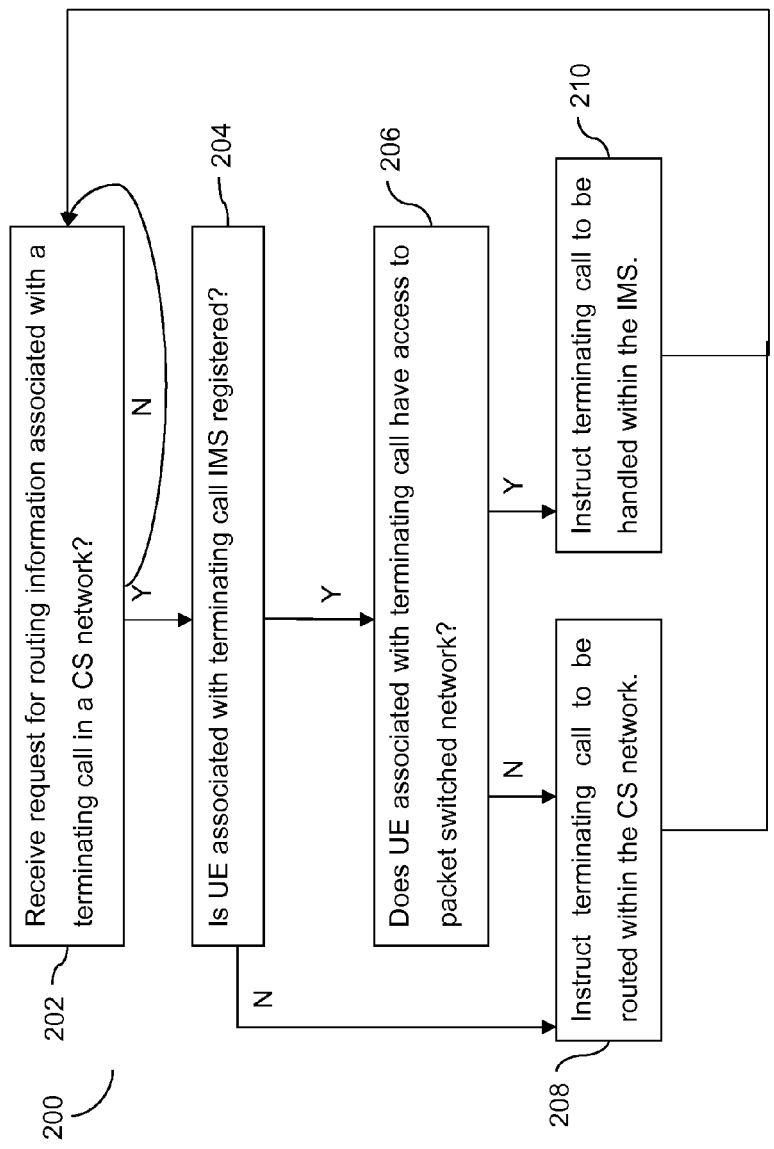
FIG. 2*a* is a flow diagram illustrating a process for a subscriber server according to an embodiment of the invention.
Figure 2B:
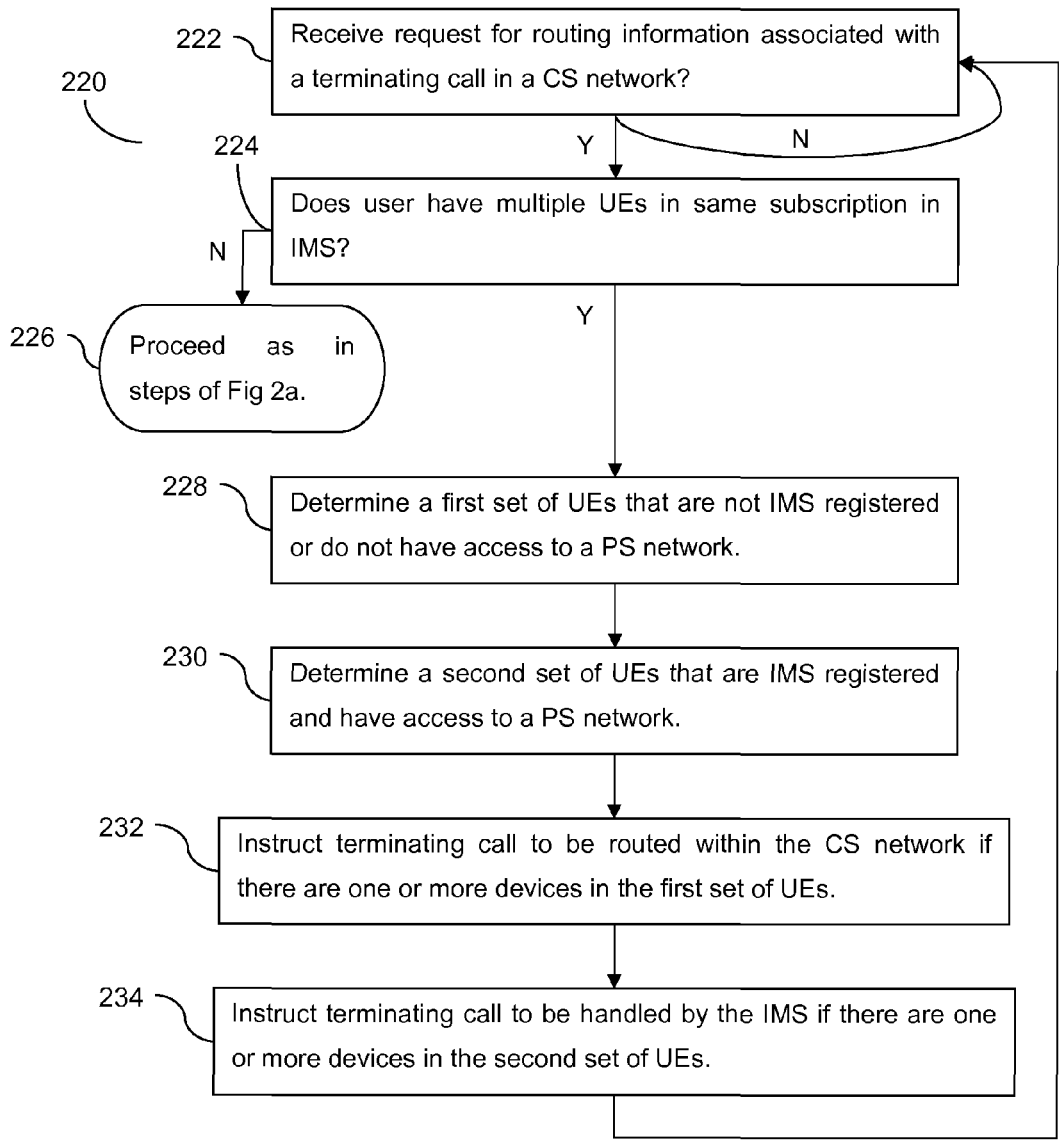
FIG. 2b is a flow diagram illustrating another process for a subscriber server according to another embodiment of the invention.
Figure 2C:
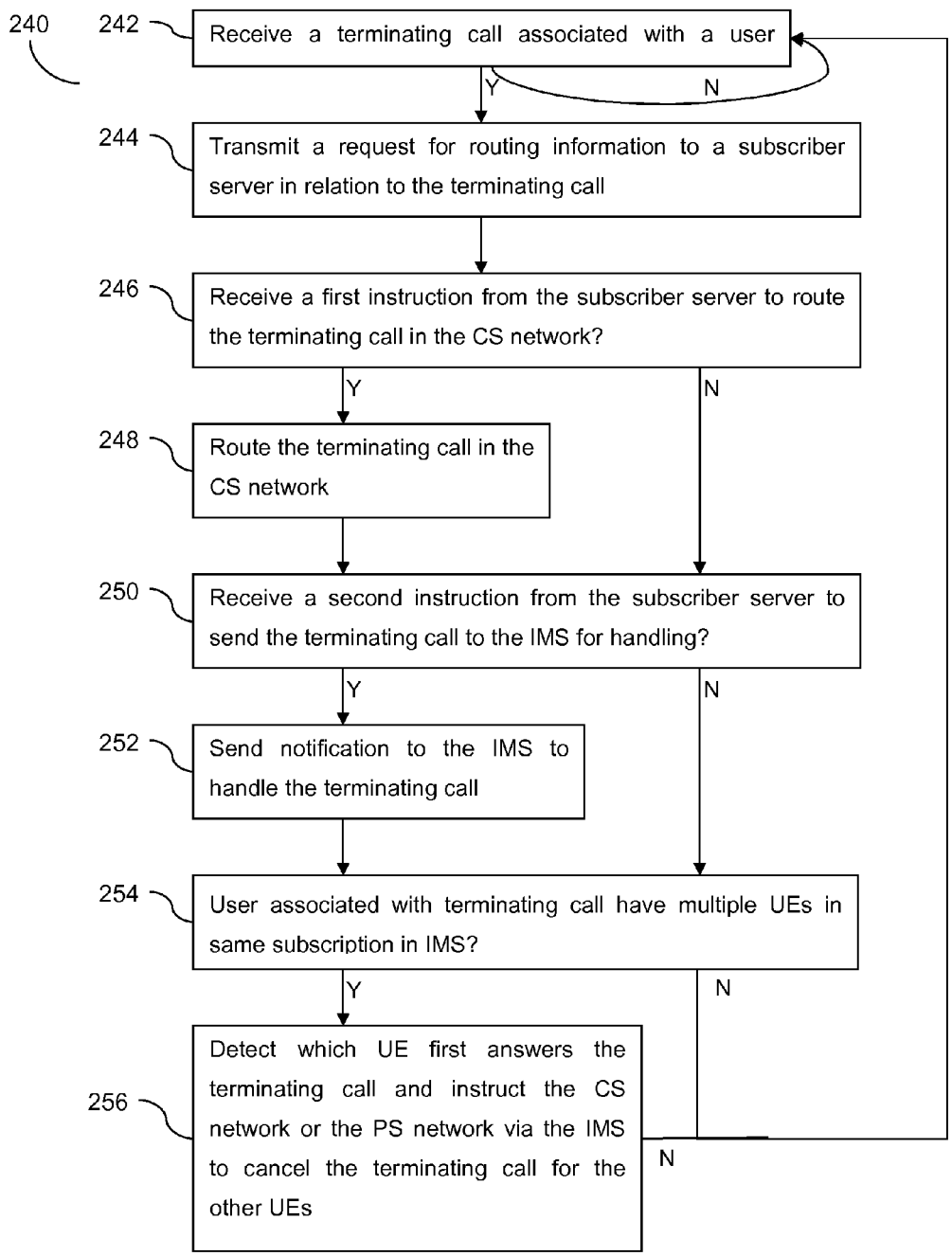
FIG. 2c is a flow diagram illustrating a process for a CS node according to an embodiment of the invention.

FIGS. 2a, 2b, and 2c are flow diagrams further illustrating the processes 200, 220, and 240 performed at either the subscriber server 154 or the CS node 152 in accordance with embodiments of the invention as discussed with respect to FIG. 1c. It is to be appreciated that FIGS. 2a, 2b, and 2c highlight the most important steps performed by the processes 200, 220, and 240, and it is apparent that the order of some of these steps can be rearranged, combined, or performed in parallel and that further intermediate steps may be necessary for implementing the embodiments of the invention as discussed herein with reference to FIGS. 1a to 1c, and 3 to 7b. The same reference numerals used in FIG. 1c will be referred to when describing the same or similar network elements.

FIG. 2a shows a flow diagram further illustrating a subscriber server process 200 for use in routing a terminating call in a network 150 according to an embodiment of the invention. The process 200 as performed on the subscriber server 154 is outlined as follows:

In step 202, the process 200 determines if the subscriber server 154 has received, from a CS node 152, a request for routing information associated with a terminating call in a CS network 104. If the result is yes (Y), then step 204 can be performed, otherwise the process 200 returns to step 202 until a request for routing information is received.

In step 204, the process 200 determines if the UE 115 associated with the terminating call is IMS registered? If yes (Y), then the process 200 continues to step 206, otherwise the process 200 continues to step 208. In step 206, the process 200 determines if the UE 115 associated with the terminating call has access to a PS network 105. If the result is yes (Y), then the process continues to step 210, otherwise the process continues to step 208.

In step 208, the process 200 at the subscriber server 154 instructs the CS node 152 to route the terminating call within the CS network 104 and the process 200 continues to step 202. In step 210, the process 200 instructs the CS node 152 that the terminating call will be handled by the IMS 108 and then the process 200 continues to step 202.

FIG. 2b shows a flow diagram further illustrating a subscriber server process 220 for use in routing a terminating call associated with a user having multiple UEs in network 150 according to an embodiment of the invention. The user has multiple UEs in the same subscription in the IMS 108. The process 220 performed at the subscriber server 154 is outlined as follows:

In step 222, the process 220 determines if the subscriber server 154 has received, from a CS node 152 a request for routing information associated with the terminating call in a CS network 104. If the result is yes (Y), then the process 220 continues to step 224, otherwise (if not (N)) the process 220 continues in step 222 until the CS node 152 receives a request for routing information associated with a terminating call.

In step 224, the process 220 determines if the user has multiple UEs in the same subscription in the IMS 108. If the result is yes (Y) then the process 220 continues to step 228, otherwise (if not (N)) the process 220 continues to step 226. In step 226, the user only has one UE, so the process 220 performs similar steps as those performed by process 200, e.g. steps 204 to 210, and then after performing these steps process 220 continues to step 222.

In step 228, the process 220 determines and generates a first set of UEs that are not IMS registered or do not have access to a PS network 105. In step 230, the process 220 determines and generates a second set of UEs that are IMS registered and have access to the PS network 105.

In step 232, the process 220 at the subscriber server 154 instructs the CS node 152 that the terminating call should be routed within the CS network 104 if there are one or more UEs in the first set of UEs. In step 234, the process 220 also instructs the CS node 152 that the terminating call will be handled by the IMS 108 if there are one or more UEs in the second set of UEs. The process 220 continues to step 222 until another request for routing information is received in relation to another terminating call associated with a user.

FIG. 2c shows a flow diagram further illustrating a CS node process 240 for use in routing a terminating call according to an embodiment of the invention. The process 240 as performed on the CS node 152 is outlined as follows:

In step 242, the process 240 determines if the CS node 152 has received a terminating call associated with UE 115. If the result is yes (Y), then the process 240 continues to step 244, otherwise (if not (N)) the process continues to step 242 until it receives another terminating call associated with UE 115.

In step 244, the process 240 at the CS node 152 then transmits a request for routing information to a subscriber server 154 in relation to the terminating call. In step 246, the process 240 determines if the CS node 152 has received, from the subscriber server 154, a first instruction to route the terminating call in the CS network 104. If the result is yes (Y), then the process 240 continues to step 248, otherwise (if not (N)) then process 240 continues to step 250.

In step 248, the process 240 at CS node 152 routes the terminating call in the CS network 104 and continues to step 250. At step 250, the process 240 determines if CS node 152 has received, from the subscriber server 154, a second instruction to send the terminating call to the IMS 108 for handling. If the result is yes (Y), then the process 240 continues to step 252, otherwise (if not (N)), then the process continues to step 254. In step 252, the process 240 sends a notification to the IMS 108 to handle the terminating call, and continues to step 254.

In step 254, the process 240 determines if the user associated with the terminating call has multiple UEs in the same subscription in the IMS 108. This can be detected by process 240 determining that multiple instructions, i.e. first and second instructions, have been received in relation to the terminating call. In any event, if the result is yes (Y), then the process 240 continues to step 256, otherwise (if not (N)) the process 240 continues to step 242 until another terminating call is received at CS node 152.

In step 256, the process 240 at CS node 152 detects or determines which UE first answers the terminating call and instructs the CS network 104, or the PS network 105 via the IMS 108 to cancel the terminating call for all the other UEs. The process 240 continues to step 242 until another terminating call is received at CS node 152.

Figure 3A:
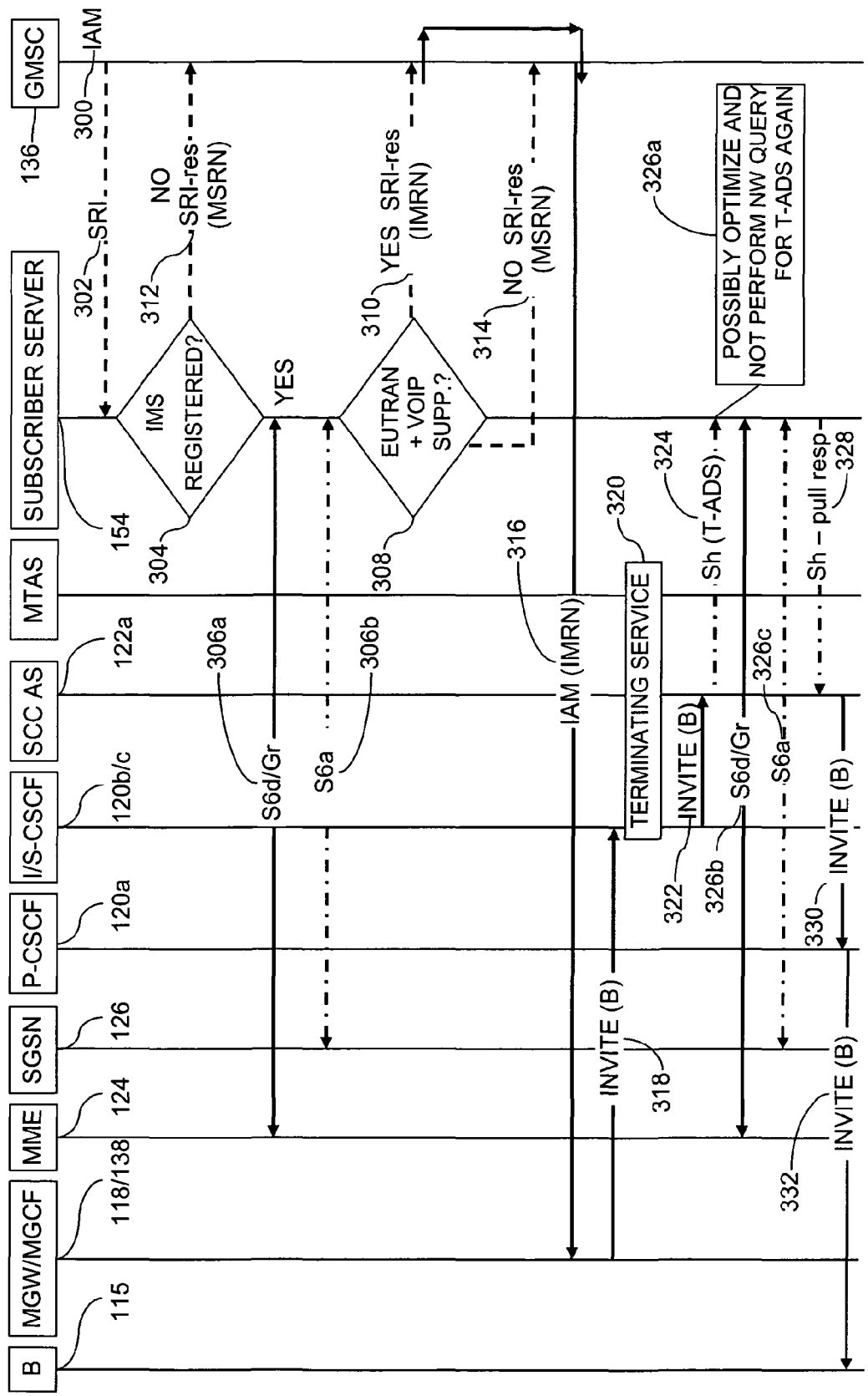
FIG. 3a is a signal flow diagram illustrating a process according to embodiments of the invention.
Figure 3B:
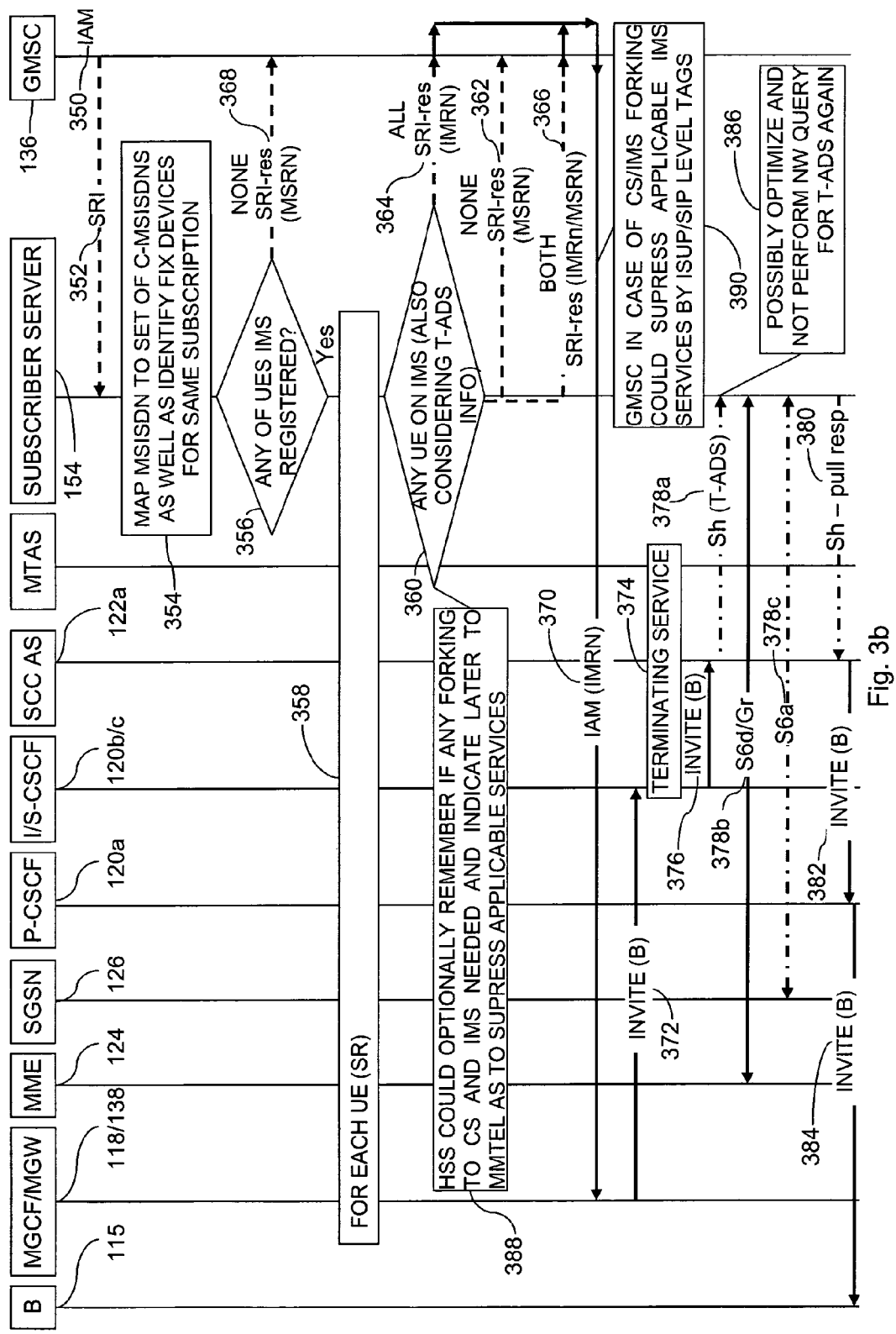
FIG. 3b is a signal flow diagram illustrating a process for multiple UEs in the same IMS subscription according to embodiments of the invention.

FIGS. 3a and 3b are signal flow diagrams further illustrating the processes performed at either the subscriber server 154 or the CS node 152 in accordance with embodiments of the invention as already described with reference to FIGS. 1c to 2c. The same reference numerals used in FIGS. 1a, 1b, and 1c will be referred to when describing the same or similar network elements.

FIG. 3a is a signal flow diagram illustrating the process of handling and/or routing a CS terminating call in a network according to an embodiment of the invention. In step 300, a GMSC 136 receives terminating traffic such as a terminating call for a VoLTE subscriber such as user B of UE 115 as indicated in a received IAM message. In step 302, the GMSC 136 sends a Send Routing Information (SRI) message to subscriber server 154, which may be a 3GPP compliant HSS, or a separated HLR/HSS, or combined HLR/HSS, requesting routing information in relation to the terminating traffic/call associated with UE 115.

In step 304, the subscriber server 154 checks, on reception of the SRI message transmitted by GMSC 136, if the VoLTE subscriber of UE 115 associated with the terminating call is IMS Registered. If so, then the subscriber server 154 determines if the UE 115 is attached to either or both of a SGSN 126 and MME 124 in steps 306a and 306b. The MME 124 is typically attached to an EPS network 107 and the SGSN is typically attached to a legacy PS network 106.

In steps 306a and 306b, the subscriber server 154 performs a network query to MME 124 and SGSN 126 to get the timestamps of latest Routing area/Tracking area update as well as current IMS VoPS support of the currently used access. The network query to MME 124 and SGSN 126 is indicated by the signals in steps 306a and 306b, respectively.

In step 308, the subscriber server 154 compares the timestamps, which are received in the responses to the signals of steps 306a and 306b from MME 124 and SGSN 126, respectively. If the last update is from a VoPS or Voice over IP (VoIP) capable network such as an evolved universal terrestrial radio access network (EUTRAN), the subscriber server 154 continues to step 310.

In step 310, the subscriber server 154 will instruct GMSC 136 to route the call to IMS 108 as indicated by the SRI response message, which includes an IMRN in relation to UE 115.

In step 312, a subsequent notification signal such as an IAM(IMRN) is sent from GMSC 136 to MGCF/MGW 138 and 118. The notification includes the IMRN in relation to UE 115 and indicates to the IMS 108 that the terminating call should be handled by the IMS 108. The remaining steps, steps 318 to 330, and signals illustrated in FIG. 3a below the IAM(IMRN) signal of step 316 can, for example, follow a conventional process to perform T-ADS in IMS for the terminating call.

In steps 314 or 316, if the user of UE 115 does not have a VoPS or VoIP capable access, or if the user of UE 115 is not registered in IMS 108 at all, the subscriber server 154 will return an instruction to the GMSC 136 as indicated by the SRI response signals/messages, which include a MSRN in relation to UE 115. On receipt of this instruction from subscriber server 154, the GMSC 136 routes the terminating call to the CS network such that the call will follow normal CS procedures to terminate the call in the CS network 104.

If the UE 115 is only attached to SGSN 126 or MME 124 (or in case the support of IMS VoPS is equal in both RA and TA lists) then the subscriber server 154 has already sufficient information to determine the IMS Voice over PS support of the currently used access in relation to UE 115.

The subscriber server 154 may store the results reported back to GMSC 136 for the case that the call is routed to the IMS 108 and the SCC-AS 122a would perform network-assisted T-ADS function 122b, in steps 324a to 324c, as well. If the subscriber server 154 does store the results from steps 306a, 306b, and 308 and/or the results reported back to GMSC 136, then the subscriber server 154 will not need to perform steps 324b or 324c (equivalent of steps 306a and 306b) can report the required information back to the SCC-AS 122a in step 326. This will allow the SCC-AS 122a to decide for termination via CS or PS networks by not performing a network query for T-ADS again. That is the subscriber server 154 does not need to make another network query to MME 124 or SGSN 126 as this has already been performed in steps 306a, 306b, and 308. Alternatively, and in case the SCC-AS 122a can accurately determine that the terminating call has been routed via the GMSC 136, then the SCC-AS 122a can safely assume that TADS has already been performed, e.g. in steps 306a, 306b, and 308, and can decide for termination via PS and can route the terminating call to the PS network 105 for PS access. The trigger for the subscriber server 154 to perform the additional procedures described herein can, for example, be based on subscription data settings.

If the subscriber server 154 comprises an HSS and HLR as two separated nodes, rather than one integrated node, the interface between the two nodes could be implemented as an extended Mobile Application Part (MAP) or possibly Sh to exchange IMS registration status and possibly a user profile for subscribers who are subject to this service. If the subscriber server 154 is implemented as two separate nodes, the interface between the HSS and HLR nodes could be enhanced to facilitate the afore-described embodiments. For example, such enhancements can include the following sub-functions:
(a) the HLR node, based on reception of information from the HSS node or subscriber information, and on determining whether the user is IMS Registered (known from IMS HSS logical function), triggers if necessary T-ADS to MME 124 and SGSN 126; and (b) the result after T-ADS and query to MME 124 and SGSN 126 is used by HLR to either respond to the MAP-SRI (or SRI message from GMSC 136) to route the terminating call to IMS using IAM(IMRN) or fetching a Mobile Station Roaming Number (MSRN) for further CS routing.

The exchange of T-ADS associated information between the HLR and HSS nodes in an embodiment wherein these elements are implemented as separate nodes can be provided as either a push or a pull mechanism. Further embodiments of the subscriber server 154 are described in further detail with reference to FIGS. 4 to 6*b*.

FIG. 3*b* is a signal flow diagram illustrating a process for handling and/or routing a terminating a call for multiple UEs in the same IMS subscription according to embodiments of the invention.

In the example networks 100 and 140, for terminating calls reaching the GMSC 136, the HSS 110 is configured to perform an enhanced SDS procedure that is combined with a T-ADS function 122*b*. It is specified in 3GPP standard 23.292 that all calls must be routed to the IMS 108 and that the T-ADS function 122*b* should be triggered by the SCC-AS node 122*a* in the IMS 108. The problem is that if the user associated with the terminating call is not registered in the IMS 108, or the user is registered in the IMS 108 but does not have IMS VoIP capable access, then the terminating call will be routed to the IMS 108 for handling. This wastes valuable network resources and can cause severe delays in processing terminating calls during the early deployment of IP based networks.

The embodiments of the invention as described with reference to FIG. 1*c* to 3*a*, have optimally changed the general ICS and T-ADS procedures to improve network performance during the early deployment of IP based networks such as VoLTE and to allow these networks to coexist with current CS networks. In essence, this has been achieved by allowing the subscriber server 154 to perform an IMS registration check and to also perform a network assisted T-ADS function, which means determining and getting the user's current access and the VoPS (or VoIP) capability by a query to MME 124 and/or SGSN 126 of an EPS network 107 or a legacy PS network 106, respectively.

In addition, these embodiments can be extended for the case in which there are multiple terminals associated with a terminating call within the same subscription in the IMS 108. A user can have a subscription in IMS 108 that can include multiple UEs in which the UEs can share identities. This means that when the user is IMS registered, any of the identities could be used to reach any of the UEs. In the 3GPP standards documents this is referred to as Implicit Registration Set and IMPU Sharing.

In an IMS Centralised Services deployment based on the 3GPP standard 23.292, the SCC-AS 122*a* would normally be in charge of finding the correct access for a terminating call. The SCC-AS 122*a* will also, in scenarios where multiple UEs are used, have the capability to control the forking of a terminating call to reach all applicable terminals. The term forking means that the terminating call may be routed or handled by multiple networks as the UEs associated with the terminating call can be in different networks having different access types. This function is performed by the IMS 108 and is performed after the T-ADS function 122*b* that was triggered by the SCC-AS 122*b*.

As an example, in a conventional ICS call when the called party or user has two VoLTE UEs in the same subscription and shares identities (IMPU Sharing), a terminating call associated with the called user is routed to the IMS 108. The SCC-AS node 122*a*, after performing/triggering a T-ADS/Network assisted T-ADS function 122*b*, will fork the calls to the UE associated with the called user on the correct network access. This is regardless of whether the two VoLTE UEs are on VoPS (or VoIP) capable access or not. If the same subscription includes fixed UEs in a Fixed and Mobile Converged model (FMC), the forking would apply to the fixed UEs.

Referring to FIG. 3*b*, an embodiment of the invention is described for routing a terminating call in a multi-terminal scenario e.g. one of the multiple terminals is on VoIP capable access and one or several are not. This embodiment further optimizes the routing of a terminating call so that all terminals, if the user is on the correct access, are connected or get alerted (e.g. the terminating call is routed to the networks having one or more of the terminals).

In step 350 a terminating call reaches GMSC 136 for a subscriber or user that has multiple VoLTE UEs, with or without additional fixed UEs, with number sharing such as IMPU Sharing in same IMS Registration Set (IRS) as defined in the 3GPP TS standard 23.228. In step 352, the GMSC 136 sends a SRISR) message (MAP-SRI) to subscriber server 154 requesting routing information in relation to the terminating call associated with the subscriber. It is assumed that UE 115 is one of the terminals in the subscribers IMS subscription.

In step 354, the subscriber server 154, upon receipt of the SRI message from GMSC 136, determines if there are any UEs registered for the subscriber. This means that, for each UE, the subscriber server 154 needs to perform a mapping of the MSISDN toward the set of C-MSISDNs, which is provisioned in the IMS user subscription (per VoLTE UE). In other words, the subscriber server 154 needs to map the MSISDN of the called party (B party or user B) to the subscription data in the IMS 108 so it can discover any C-MSISDN and/or fixed UEs related to user B. For those UEs that are IMS registered, the subscriber server 154 can continue to step 356. However, if there are no IMS Registrations for any or some of the UEs, then for these UEs the terminating call associated with user B can be allowed to continue in the CS network 104. In step 368, the subscriber server 154 responds, to the received SRI message from GMSC 136, with an SRI response message including the MSRN of user B.

In step 356, the subscriber server 154, determines if any of the UEs are IMS registered. In step 358, the subscriber server 154 performs a T-ADS and Network assisted T-ADS function only for those UEs that are IMS registered. The T-ADS function is used to determine whether those IMS registered UEs have Voice over PS (or VoIP) capable access. Depending on the result, the terminating call might still go to the CS network 104 only when none of the UEs are in IMS/LTE coverage or on VoIP capable PS network 105 access. Alternatively, the terminating call might go to IMS 108 only and then handled as normal by SCC-AS when all of the UEs are in IMS 108 on LTE access (PS network access 105) with VoIP capability. Otherwise, the terminating call might be "forked" to both CS network 104 and the IMS 108. In step 360, the subscriber server 154 stores the results and responds, or instructs, the GMSC 136.

In step 360, if none of the UEs are IMS registered or have VoIP capable access, then the subscriber server 154 instructs the GMSC 136 in step 362 to route the terminating call in the CS network 104. In step 362, the subscriber server 154 will return an instruction to the GMSC 136 as indicated by the SRI response signals/messages, which include an MSRN in relation to the UEs. On receipt of this instruction from subscriber server 154, the GMSC 136 routes the terminating call to the CS network such that the call will follow normal CS procedures to terminate the call in the CS network 104.

In step 360, if all of the UEs are IMS registered and have VoIP capable access, then the subscriber server 154 instructs the GMSC 136 to send the terminating call to the IMS 108. This means that the terminating call is sent or is routed to the IMS 108 only and then handled as normal by SCC-AS 122a. In step 364, the subscriber server 154 will return an instruction to the GMSC 136 as indicated by the SRI response message, which includes an IMRN in relation to the UEs.

In step 360, if only some of UEs are IMS registered and have VoIP capable access and some of the UEs do not, then the subscriber server 154 instructs the GMSC 136 to route or deliver the terminating call to both the IMS 108 and the CS network 104. The terminating call is "forked" to both CS network 104 and the IMS 108. In step 366, the subscriber server 154 will return an instruction to the GMSC 136 as indicated by the SRI response message, which includes both an IMRN in relation to the UEs and an MSRN in relation to UEs. Alternatively, the instruction may include two SRI response messages, in which one includes an IMRN in relation to the UEs and the other includes an MSRN in relation to the UEs. When the terminating call is forked to IMS 108 (and terminated in the PS network 105) and the CS network 104, the first UEs on any access answering will be the user B and the other legs can be cancelled by GMSC 136. The GMSC 136 detects or determines which UE first answers the terminating call and instructs or notifies the CS network 104 or the PS network 105, via the IMS 108, to cancel the terminating call for the other UEs.

In addition to performing steps 360 and 362, the subscriber server 154 can also instruct the GMSC 136 in step 356. In step 356, the subscriber server 154 determined if any of the UEs terminals are registered in IMS 108. At this stage, for those UEs that are not registered in IMS 108 at all, the subscriber server 154 can return in step 368 an instruction to the GMSC 136 as indicated by the SRI response signal/message, which includes a MSRN in relation to the UEs not IMS registered. On receipt of this instruction from subscriber server 154, the GMSC 136 uses the routing information to route the terminating call to the CS network such that the call will follow normal CS procedures and terminate the call in the CS network 104. However, for those UEs in step 356 that are IMS registered the subscriber server 154 proceeds to step 358 to check for VoIP support.

In step 370, after the GMSC 136 receives an SRI response message that includes an IMRN from subscriber server 154, a subsequent notification signal, e.g. an IAM(IMRN), is sent from GMSC 136 to MGCF/MGW 138 and 118. The notification includes the IMRN in relation to those UEs that are IMS registered and have VoPS (or VoIP) access. The IMRN indicates to the IMS 108 that the terminating call should be handled by the IMS 108. The remaining steps, steps 372 to 384, and signals illustrated in FIG. 3b below the IAM(IMRN) signal of step 370 can, for example, follow a conventional process to perform T-ADS in IMS 108 for the terminating call.

In addition, when the terminating call reaches in the IMS 108 to the SCC-AS 122a, it will perform the T-ADS function and assuming the normal model of ICS, it might perform a break-out again to the CS network 104. To avoid this, the Sh interface toward the subscriber server 154, e.g. step 380, can be extended to indicate to the SCC-AS 122a that the forking has been performed already (by GMSC 136).

The subscriber server 154 can store the results of previous T-ADS network queries performed in step 358. When a new network query for T-ADS from the SCC-AS 122a in IMS 108 is received at subscriber server 154, for example when SCC-AS performs a T-ADS query over Sh in step 378a, then in step 386 the subscriber server 154 does not need to perform steps 378b or 378c of the network assisted query again. Instead, subscriber server 154 skips steps 378b and 378c, and in step 380 can over Sh inform SCC-AS 122a which UEs are subject for this call termination (e.g. the UEs with a C-MSISDN not on VoIP capable access should not be considered by SCC-AS 122a) and no break-out to CS network 104 is needed, which has already been performed by subscriber server 154 and GMSC 136 within steps 350 to 368.

The SCC-AS 122a sets up a terminating call to only address the UEs over VoIP capable access, use caller preferences (RFC 3841), based on the registration status received over ISC including feature tags identifying the UEs (sip.instance as defined in the 3GPP TS standard 24.229) and information received over Sh.

If the terminating call is forked in which at least one UE is not IMS registered or has VoIP access and at least one other UE is IMS registered and has VoIP access, then two different service engines (one in the IMS 108 and one in the CS network 104) will be used at the same time. This may cause some interaction problems to occur such as the dual execution of multiple service engine and supplementary services. For example, if the terminating call goes to both IMS 108 and the CS network 104 because there are at least two UEs in the subscription, and the terminating user has Call Forwarding no Answer-Reply, then there is a risk that both IMS 108 and CS network 104 will forward/route the terminating call to a third party (party C). The required procedure should be that only the CS network or the IMS 108 forwards/routes the terminating call to party C.

This can be achieved in step 388, by dynamically disabling call services in the subscriber server 154 or other HSS. In the case, when performing the SDS, e.g. steps 354 to steps 360, the subscriber server 154 determines if there is at least one UE that will use CS access on the CS network 104 and if there is at least one UE that uses PS access on the PS network 105, e.g. the IMS 108. If there is, then the subscriber server 154 disables the incompatible service in IMS 108, which means that the CS service engine will always execute the services to a third party. This also means that the MMTel AS will need to perform a query to to the subscriber server 154 (Sh interface) determine which applicable services are to be suppressed.

Alternatively, the current framework for Dynamic services interactions is provided in 3GPP TS standard 23.228, in which Application Servers can add what service is executed and services that should not be executed are extended such that also the MSC/MGCF 118 and 138 can also add such parameters. The MSC/MGCF 118 and 138 can then be instructed to add that it will execute certain services, e.g. "Call Forwarding no Reply", and that these certain services should not be executed by subsequent Application Servers. The MSC/MGCF can notify or be notified that it will execute or not execute certain services in steps 364 or 366, when it is determined that there exist UEs that are IMS registered and have VoIP access.

Figure 4:
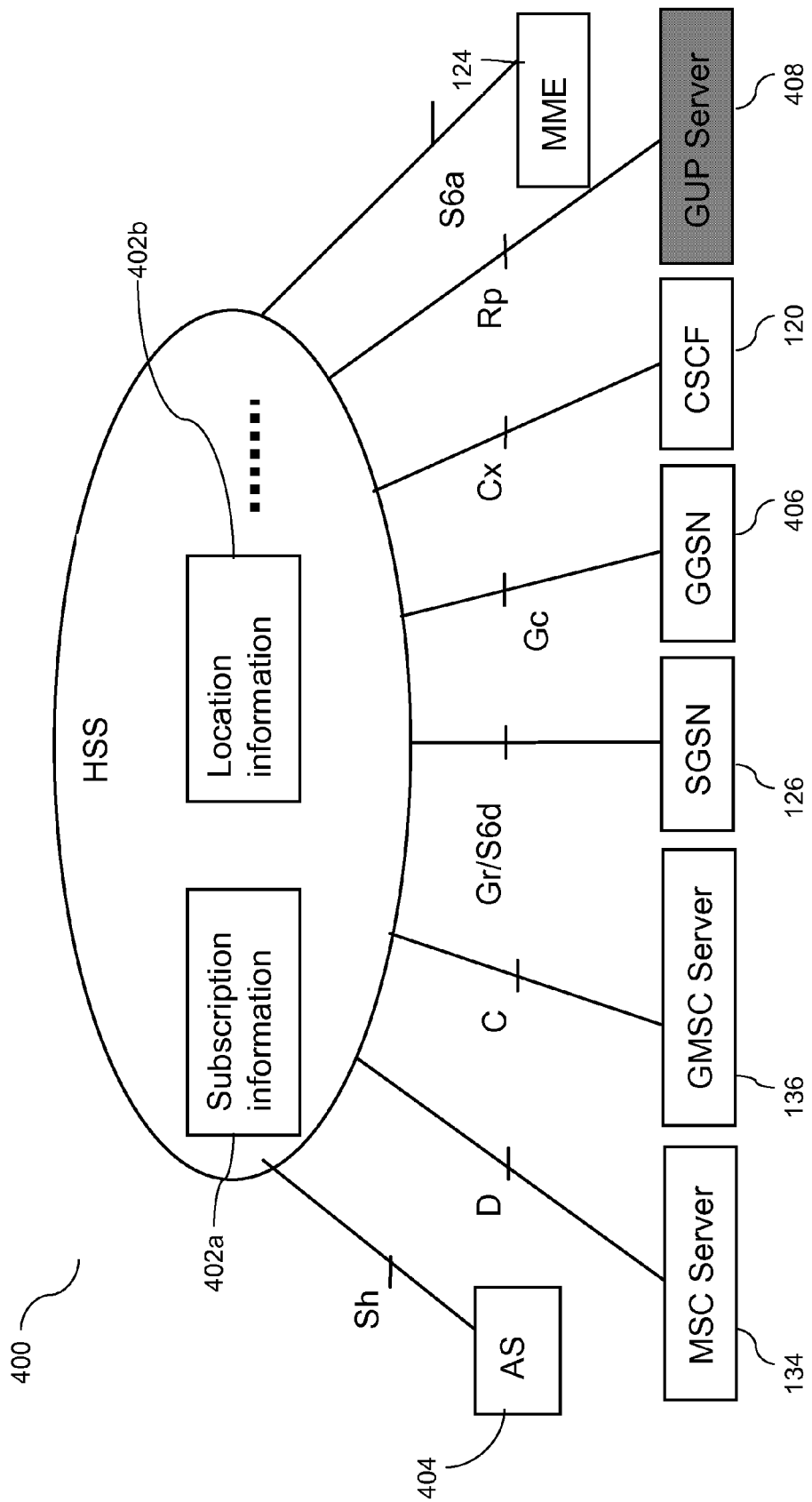
FIG. 4 illustrates schematically a known 3GPP compliant HSS for performing the process according to embodiments of the invention.

FIG. 4 is a schematic illustration of an exemplary embodiment of a subscriber server 400 including the functionality of a generic 3GPP HSS and its basic interfaces. These interfaces allow the subscriber server 154 to be configured or arranged to perform the exemplary embodiments of the invention. The same reference numerals used in FIGS. 1a, 1b, and 1c will be referred to when describing the same or similar network elements.

The 3GPP TS 23.002 standard defines the 3GPP HSS functionality. As subscriber server 400 includes the functionality of a 3GPP HSS, it may comprise or include a master database 402 including, but not limited to, a subscription information database 402a and location information database 402b for subscription-related information of a given user or subscriber. The subscriber server 400 also includes functionality for communicating with most nodes associated with the CS network, PS network (including EPS networks and legacy PS networks), and IMS 108. The subscriber server 400 is shown in FIG. 4 to communicate with a AS 404 over Sh, an MSC Server 134 and a GMSC server 136 over D and C, respectively, an SGSN 126 and a GGSN 406 communicating over Gr/Sg6 and Gc, respectively, a CSCF 120 over Cx, an GUP Server over Rp, and an MME 124 over S6a.

In addition, the subscriber server 400 includes the following 3GPP specific functionalities. An IP multimedia functionality is provided to support the control functions of the IMS 108 such as the CSCF 120. This is needed to enable subscriber usage of the IM Core Network (CN) subsystem services. This IP multimedia functionality is independent of the access network used to access the IM CN subsystem. The subset of the home location register (HLR)/AUC functionalities that are required by the PS network such as for GPRS and EPC/EPS. The subsets of the HLR/AUC functionality required by the CS network 104 if it is desired to enable user or subscriber access to the CS network 104 or to support roaming to legacy PS networks 106 such as GSM or UMTS.

Although the 3GPP definition of the subscriber server 400 includes support for the IMS 108, PS network 105 (legacy PS networks like GPRS and EPS networks like LTE) and CS network 104, in the transition to an all IP based network the subscriber servers 154 deployed may not necessarily include all the functionality of the subscriber server 400. This is because the subscriber server 154 may be based on legacy subscriber server technology that provides only partial 3GPP functionality or even non 3GPP compliant functionality, for example the subscriber server 154 could be a GSM HLR serving the CS network.

The transition from legacy CS networks 104 and legacy PS networks 106 to all IP based networks including EPS networks 107 may require existing legacy subscriber server technology to be configured or arranged to implement the exemplary embodiments of the invention.

For example, some subscriber servers may include the functionality of an HSS that serves the IMS or EPS networks only, others may include the functionality of an HSS that serves legacy PS networks 106 and EPS networks 107, and others still may only include the functionality of an HLR and/or an HSS that serves a CS network 104 and/or legacy PS networks 106. The necessary interworking required between the different subscriber servers and IMS for implementing the exemplary embodiments of the invention is now described with reference to FIGS. 5a to 6c.

FIGS. 5a to 6c are signal flow diagrams illustrating the interworking between different configurations of a subscriber server 154 according to the invention and the CS network 104, the PS network 105, and the IMS 108. The same reference numerals used in FIGS. 1a, 1b, and 1c are reused in FIGS. 5a to 6c identifying the same or similar network nodes.

Figure 5A:
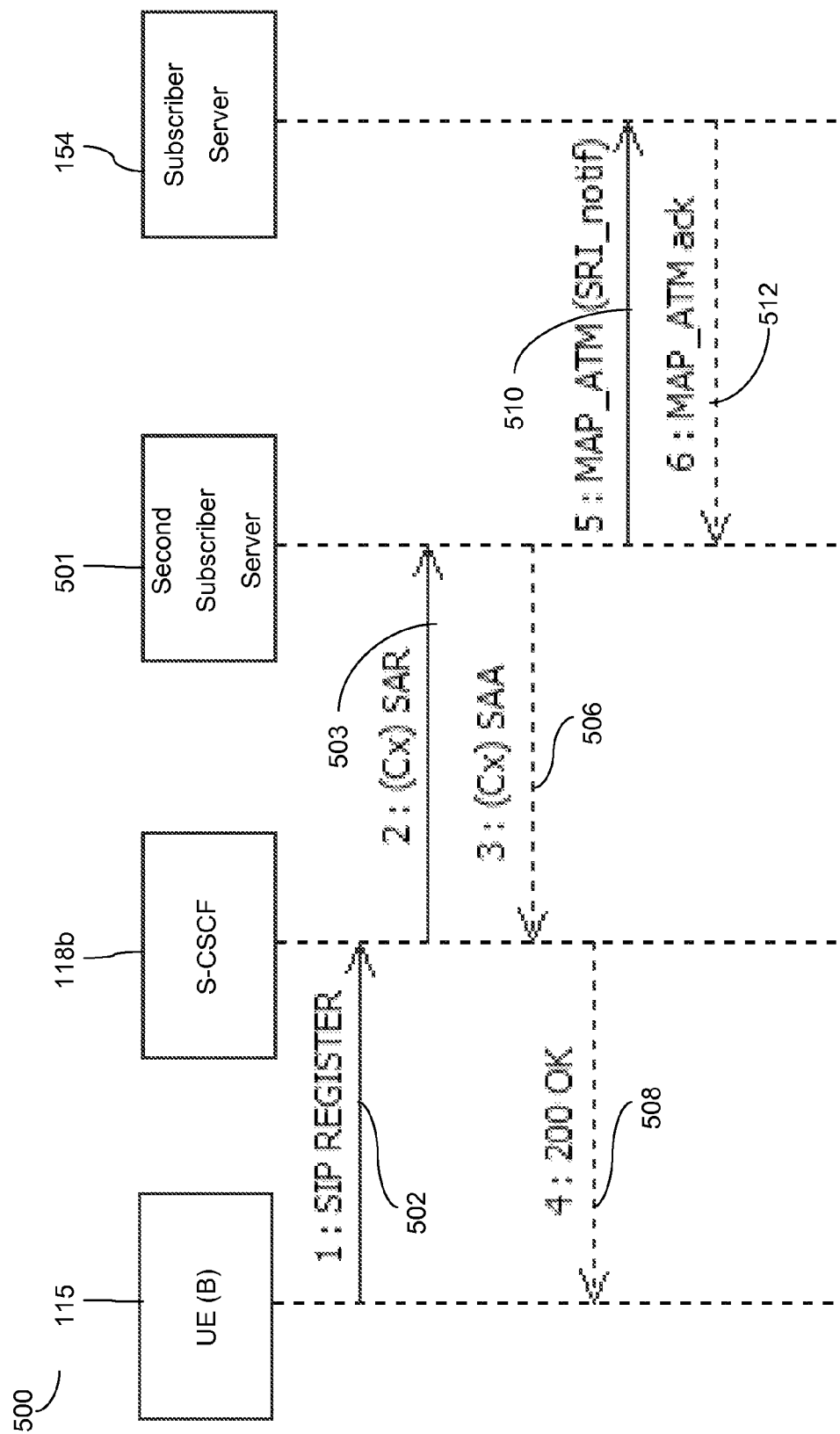
FIG. 5a is signal flow diagram illustrating an IMS user registration process for use in the process according to embodiments of the invention.
Figure 5B:
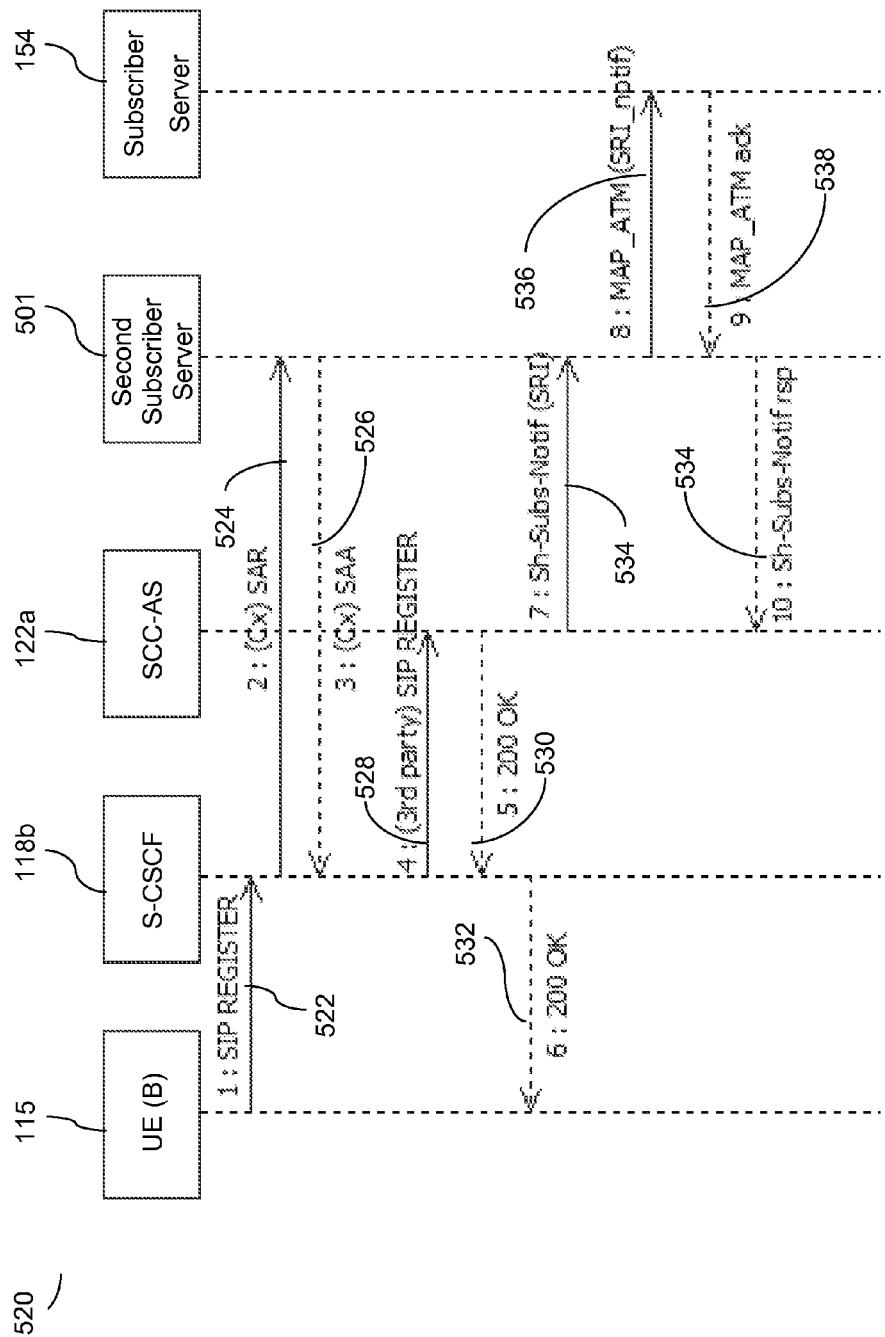
FIG. 5b is signal flow diagram illustrating another IMS user registration process for use in the process according to embodiments of the invention.
Figure 6A:
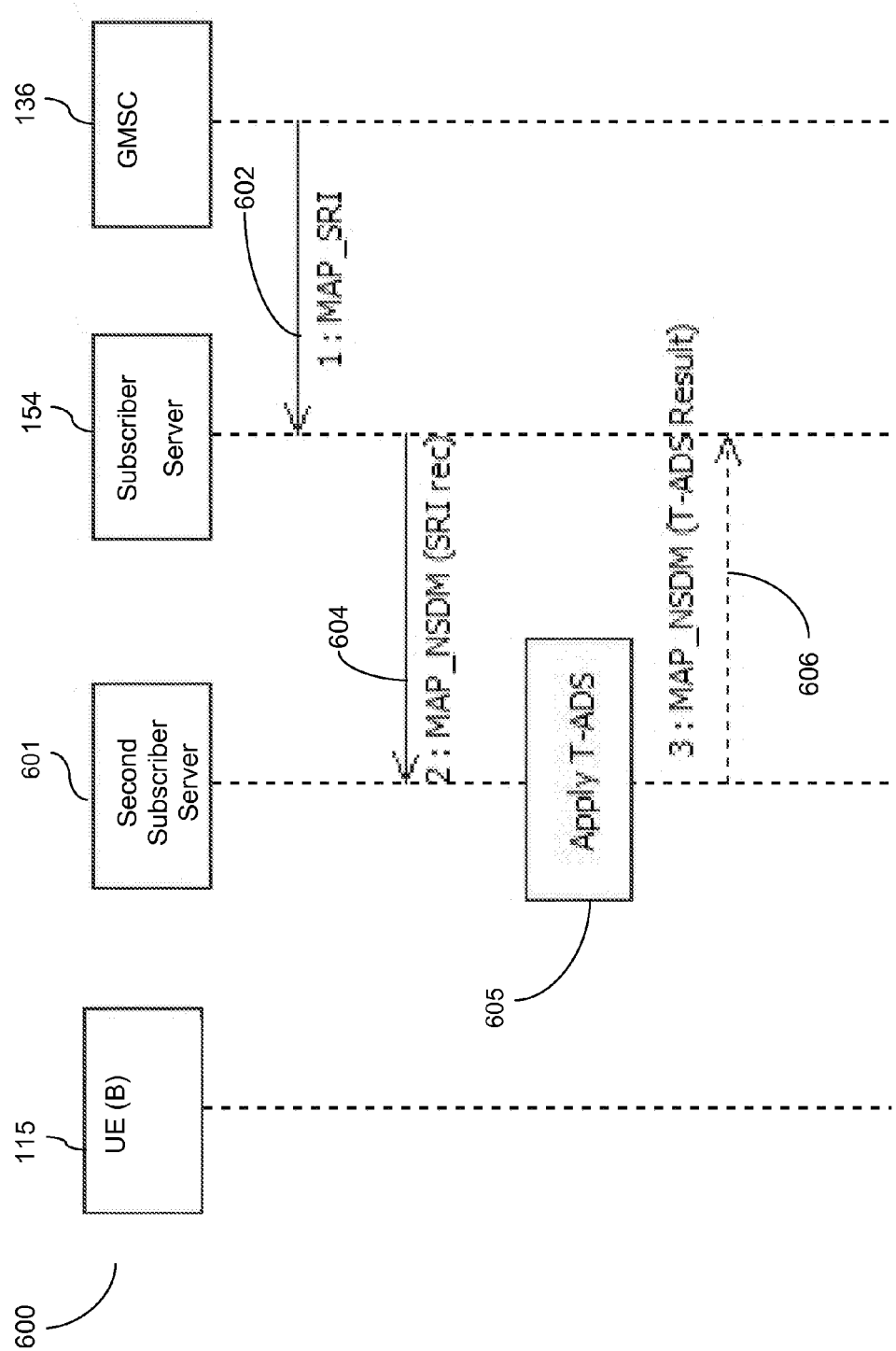
FIG. 6a is a signal flow diagram illustrating a process for triggering a T-ADS function for use in process according to embodiments of the invention.
Figure 6C:
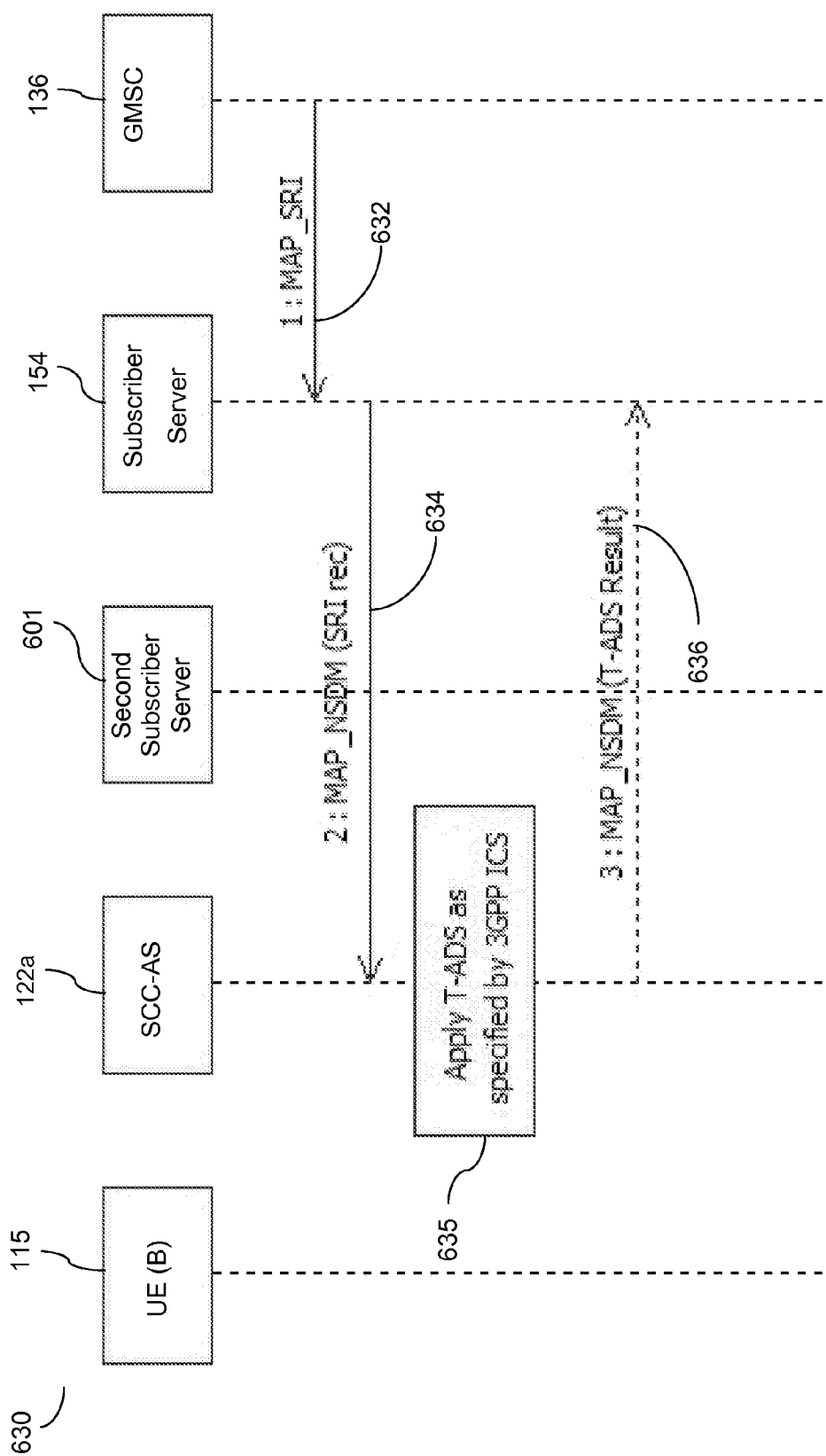
FIG. 6c is a signal flow diagram illustrating another process for triggering a T-ADS function for use in the process according to embodiments of the invention.

In particular, FIGS. 5a to 5c are signal flow diagrams illustrating embodiments of a process for providing the subscriber server 154 with IMS Registration status information for use in routing the terminating call according to embodiments of the invention. FIGS. 6a to 6c are signal flow diagrams illustrating embodiments of a process for use in querying/triggering a T-ADS function when routing the terminating call according to embodiments of the invention.

The IMS 108 and EPS networks 107 may be supported by the second subscriber server 501, where the CS and legacy PS networks are supported by subscriber server 154. It is to be appreciated that the subscriber server 154 and the second subscriber server 501 could be separate nodes or collocated within the same node of the network. In these figures, the subscriber server 154 is described as having the functionality of an HLR serving the CS and legacy PS networks. However, it is to be appreciated that the subscriber server 154 may also include the functionality of an HSS that supports the IMS and/or the EPS network such as the second subscriber server 501. In any event, these the processing logic providing the functionality of the subscriber server 154 and the second subscriber server 501 need to be able to communicate efficiently to allow subscriber server 154 to be configured to efficiently perform the exemplary embodiments of the invention.

Referring to FIG. 5a, the signal flow diagram illustrates an embodiment of a process 500 for providing IMS registration status information to the subscriber server 154. In the initial phase of deploying an IP-based network, operators may deploy some initial ICS support without an SCC-AS 122a node being deployed in the IMS 108. In essence, the IMS registration status information for user B or UE 115 is pushed from the second subscriber server 501 to the subscriber server 154 during the IMS Registration of UE 115 with the IMS 108. The IMS registration information in relation to UE 115 is stored at subscriber server 154, which will later receive the MAP SRI requests in relation to terminating calls from a CS node 152 or GMSC 136.

In step 502, UE 115 performs an IMS registration by sending a SIP_Register request to the S-CSCF node 118b. The S-CSCF node 118b registers UE 115 in the IMS, in step 504, by sending to second subscriber server 501 the IMS registration information relating to UE 115 on Cx using a SAR message. In step 506, second subscriber server 501 stores the IMS registration on receipt of the SAR message and responds to S-CSCF 118b on Cx with an SAA message. In step 508, S-CSCF responds to the SAA message on Cx by acknowledging the SIP REGISTER request of UE 115 with acknowledgement message 200 OK, indicating UE 115 is now IMS registered. In step 510, in response to the Cx SAR operation, second subscriber server 501 also sends a MAP Any_Time_Modification (MAP ATM) message to the subscriber server 154. In step 512, the subscriber server 154, on reception of the MAP Any_Time_Modification (MAP ATM) message from second subscriber server 501, sends a MAP_ATM acknowledgement message to the second subscriber server 501.

The MAP ATM shall include a subscription notification for subscriber server 154 to send further SRI notifications to the second subscriber server 501 of any incoming SRI requests received at subscriber server 154. This is required so that subscriber server 154 can trigger at a later time, during the process for routing a terminating call according to the invention, a T-ADS function/process in second subscriber server 501. The MAP ATM shall include the address of the second subscriber server 501 so the subscriber server 154 can send subsequent SRI notifications. If the second subscriber server 501, which sends the MAP ATM message, is not the same subscriber server that serves the EPS network, then the second subscriber server 501 shall be made aware of the corresponding subscriber server in the EPS network that manages the UE 115 via configuration of International mobile subscriber identity (IMSI) ranges in second subscriber server 501. In this case, the second subscriber server 501 may include the address of the other subscriber server serving the EPS network within the MAP_ATM message, which will also allow the subscriber server 154 to send SRI notifications accordingly.

In addition, the MAP ATM may include an explicit indication of the IMS registration status information of UE 115. Alternatively, the reception of the MAP ATM message at subscriber server 154, along with the subscription notification of SRI requests for that UE 115, can be interpreted by the subscriber server 154 as an implicit indication that the UE 115 is IMS registered. The subscriber server 154 stores the explicit or implicit IMS registration status information for UE 115 for later use, e.g. in routing a terminating call associated with UE 115 according to the invention as described herein.

Referring to FIG. 5b, the signal flow diagram illustrates another embodiment of a process 520 for providing IMS registration status information to the subscriber server 154. In this embodiment, it is assumed that an SCC-AS 122a is deployed in the IMS 108.

In step 522, UE 115 performs an IMS registration by sending a SIP_Register request to the S-CSCF node 118b. The S-CSCF 118b registers UE 115 in the IMS, in step 524, by sending to second subscriber server 501 the IMS registration information relating to UE 115 on Cx using a SAR message. In step 526, second subscriber server 501 stores the IMS registration on receipt of the SAR message and responds to S-CSCF 118b on Cx with an SAA message.

In step 528, the S-CSCF 118a sends at 3rd party SIP REGISTER message to SCC-AS 122a notifying SCC-AS 122a that UE 115 has registered in the IMS. In step 530, SCC-AS acknowledges the 3rd party SIP REGISTER message with an acknowledgement message 200 OK. In step 532, S-CSCF 118b sends, in response to the acknowledgement from SCC-AS 122a, an acknowledgement message 200 OK acknowledging the SIP REGISTER request of UE 115.

In the meantime, at step 534, on 3rd party SIP REGISTER reception, SCC-AS 122a requests, using the Sh Subscribe-Notify operation via second subscriber server 501, to be notified of any MAP SRI requests received by subscriber server 154 for UE 115 in the CS network 104. In step 536, in response to the Sh Subscribe-Notify operation, second subscriber server 501 also sends a MAP Any_Time_Modification (MAP ATM) message to the subscriber server 154. In step 538, the subscriber server 154, on reception of the MAP Any_Time_Modification (MAP ATM) message and subscription notification of SRI messages from second subscriber server 501, sends second subscriber server 501 a MAP_ATM acknowledgement message. In step 534, second subscriber server 501 sends a Sh Subscription notification response message to SCC-AS 122a.

As described with reference to FIG. 5a, the MAP ATM shall include a subscription notification for subscriber server 154 to send further SRI notifications to the second subscriber server 501 of any incoming SRI requests received at subscriber server 154, in response to which the second subscriber server 501 may forward the SRI notifications to SCC-AS 122a. Similarly, MAP ATM may include an implicit or explicit indication of the IMS registration status information of UE 115.

Referring to FIG. 5c, the signal flow diagram illustrates a further embodiment of a process 540 for providing IMS registration status information to the subscriber server 154. In this embodiment the SCC-AS 122a manages a MAP interface directly with the subscriber server 154. This is instead of using the Sh interface as detailed above and in the 3GPP ICS standards.

In step 552, UE 115 performs an IMS registration by sending a SIP_Register request to the S-CSCF node 118b. The S-CSCF 118b registers UE 115 in the IMS, in step 554, by sending to second subscriber server 501 the IMS registration information relating to UE 115 on Cx using a SAR message. In step 556, second subscriber server 501 stores the IMS registration on receipt of the SAR message and responds to S-CSCF 118b on Cx with an SAA message.

In step 558, the S-CSCF 118a sends at 3rd party SIP REGISTER message to SCC-AS 122a notifying SCC-AS 122a that UE 115 has registered in the IMS. In step 560, SCC-AS acknowledges the 3rd party SIP REGISTER message with acknowledgement message 200 OK. In step 562, S-CSCF 118b sends, in response to the acknowledgement from SCC-AS 122a, an acknowledgement message 200 OK to UE 115 acknowledging the SIP REGISTER request and indicating UE 115 is IMS registered.

In the meantime, at step 564, on 3rd party SIP REGISTER reception, SCC-AS 122a sends a MAP Any_Time_Modification (MAP ATM) message including a subscription SRI notification to the subscriber server 154. In step 568, the subscriber server 154, on reception of the MAP Any_Time_Modification (MAP ATM) message and subscription notification of SRI messages from SCC-AS 122a sends a MAP_ATM acknowledgement message to SCC-AS 122a.

As described with reference to FIG. 5a, the MAP ATM shall include a subscription notification for subscriber server 154 to send further SRI notifications to the SCC-AS 122a of any incoming SRI requests received at subscriber server 154. Similarly, MAP ATM may include an implicit or explicit indication of the IMS registration status information of UE 115.

Using this approach, SCC-AS 122a shall include its own address within the MAP ATM, in step 564, which allows subscriber server 154 to initiate the corresponding SRI notifications to SCC-AS upon reception of subsequent MAP SRI requests for UE 115.

For all the embodiments illustrated in FIGS. 5a to 5c, the existing MAP ATM operation can be extended so that a network element using this extension can subscribe (in the subscriber server 154) to be notified, through the already existing MAP Note_subscriber_Data_Modified (MAP NSDM) operation described in 3GPP TS 29.002 "Map Specification", when the subscriber server 154 receives a MAP SRI for the involved mobile subscriber ISDN number (MSISDN).

In relation to FIG. 5b, when the SCC-AS 122a is deployed, it uses Sh interface (as defined in 3GPP TS 29.328) towards second subscriber server 501, (instead of the MAP interface towards subscriber server 154 as described in FIG. 5c), then an extension to the Sh-Subs-Notif procedure is needed enabling SCC-AS 122a to be sent subscription-to-notifications on MAP SRIs received at subscriber server 154 (for registered subscribers such as UE 115) from the CS network 104 (domain).

Referring to FIGS. 5a to 5c, when UE 115 is de-registered from the IMS 108, which could be network initiated, user initiated or through administration procedures, the SCC-AS 122a and/or second subscriber server 501 must cancel the previously subscribed SRI notifications in relation to UE 115 (e.g. using existing MAP ATM and Sh-Subs-Notif procedures). In FIG. 5a, when there is no SCC-AS 122a deployed, it will be the second subscriber server 501 that removes or cancels previous SRI subscription in relation to UE 115 (e.g. at Cx_SAR reception from S-CSCF or at an administration de-registration order).

As already discussed, when a terminating call for a target ICS-enabled user, e.g. user 115, is received in the CS network by a GMSC 136, which sends a MAP SRI to the subscriber server 154, then subscriber server 154 executes an enhanced SDS procedure according to the exemplary embodiments of the invention.

FIGS. 6a, 6b, and 6c are signal flow diagrams illustrating several embodiments of a process that will allow the subscriber server 154 to perform or trigger a T-ADS function when performing the enhanced SDS procedure according to the invention. It is assumed that an ICS user such as UE 115 has already been registered in the IMS 108 and its IMS registration status information has been reported to subscriber server 154 based on the processes described with reference to FIGS. 5a to 5c. This means that a subscription to notifications of reception of MAP SRI requests is active for those nodes that reported the IMS registration information to subscriber server 154, via a previous reception of MAP ATM upon IMS registration as described with reference to FIGS. 5a to 5c.

Referring to FIGS. 6a to 6c, the IMS 108 and EPS networks 107 may be supported by the second subscriber server 601, where the CS and legacy PS networks are supported by subscriber server 154. It is to be appreciated that the subscriber server 154 and the second subscriber server 601 could be separate nodes or collocated within the same node of the network. In these figures, the subscriber server 154 is described as having the functionality of an HLR serving the CS and legacy PS networks. However, it is to be appreciated that the subscriber server 154 may also include the functionality of an HSS that supports the IMS and/or the EPS networks such as the second subscriber server 601. In any event, these figures describe the processing logic that may be needed to allow the subscriber server 154 and the second subscriber server 601 to communicate efficiently for allowing subscriber server 154 to be configured to efficiently perform the exemplary embodiments of the invention.

Referring to FIG. 6a, the signal flow diagram illustrates an embodiment of a process 600 for use by subscriber server 154 to trigger a T-ADS function when routing the terminating call according to embodiments of the invention.

In step 602, the subscriber server 154 receives a MAP SRI request or request for routing information from a CS node such as GMSC 136 in relation to a terminating call relating to UE 115. On receiving the Send Routing Information message i.e. MAP_SRI, the subscriber server 154 executes the enhanced SDS procedures according to the invention. The procedure includes performing a query to PS network nodes, e.g. MME 124 and SGSN 126 (not shown), for the current access type and VoIP PS support in relation to UE 115. That is a T-ADS function is performed or triggered by subscriber server 154. In step 604, subscriber server 154 triggers a T-ADS function by sending a MAP Note_Subscriber_Data_Modified (MAP NSDM) operation towards the address of a second subscriber server 601, which may be an HSS that supports the EPS network, this address is previously recorded in the subscription information of subscriber server 154. Some of the procedures for recording this information at subscriber server 154 is previously described with reference to FIGS. 5a to 5c.

In step 605, the received MAP NSDM in relation to user 115 is interpreted by the second subscriber server 601 as an indication that it should trigger a T-ADS function or procedure in relation to UE 115. This depends on the interface support at the second subscriber server 601. Different alternatives are possible.

The second subscriber server 601 can perform a network query by querying one or more nodes in the legacy PS network and/or EPS networks. For example, the second subscriber server 601 may contact an MME node 124 over Diameter S6a and an SGSN node 126 both over Diameter S6d and MAP Gr. If the second subscriber server 601 does not support the legacy PS networks, then it may trigger another subscriber server to perform the query. Alternatively, subscriber server 164 could query the SGSN node of the legacy PS network.

Alternatively, the second subscriber server 601 may contact MME 124 over Diameter S6a and SGSN 126 over Diameter S6d. In this case, the second subscriber server 601 either requests subscriber server 154 to contact the SGSN node 126 over MAP Gr by sending a MAP ATI. The subscriber server 154 may itself contact SGSN node 126 without any explicit indication from the second subscriber server 601. Once the relevant T-ADS results are received at the second subscriber server 601, then these are reported back the subscriber server 154 in step 606. In step 606 a MAP_NSDM signal (or a MAP_NSDM Acknowledge signal) carrying the T-ADS result is sent to the subscriber server 154. The subscriber server 154 stores the T-ADS result and proceeds to perform the remaining steps of the enhanced SDS process according to the invention.

Referring to FIG. 6b, the signal flow diagram illustrates another embodiment of a process 610 for use by subscriber server 154 to trigger a T-ADS function when routing the terminating call according to embodiments of the invention. The T-ADS procedures are supported by an SCC-AS 122a deployed in the IMS 108. In this case, although the SCC-AS 122a is involved in supporting the T-ADS function, the SCC-AS 122a does not manage a direct MAP interface towards subscriber server 154. Instead the SCC-AS 122a uses the Sh interface towards a second subscriber server 601.

In step 612, the subscriber server 154 receives a MAP SRI request or request for routing information from a CS node such as GMSC 136 in relation to a terminating call relating to UE 115. On receiving the SRI message i.e. MAP_SRI, the subscriber server 154 executes the enhanced SDS procedures according to the invention. The enhanced SDS procedure includes performing a query to the EPS network nodes and/or legacy PS network nodes, such as MME 124 and SGSN 126 (not shown), respectively, for the current access type and VoPS support in relation to UE 115. That is the subscriber server 154 triggers another subscriber server to perform the T-ADS function In step 614, subscriber server 154 triggers the T-ADS function by sending a MAP Note_Subscriber_Data_Modified (MAP NSDM) operation towards the address of a second subscriber server 601, which may be an address of an subscriber server serving the EPS network, that has been previously recorded in the subscription information of subscriber server 154 as described with reference to FIGS. 5a to 5c.

In step 616, the second subscriber server 601 uses the Sh interface towards SCC-AS 122a to send a Sh-Notif (SRI received) operation in relation to UE 115 to SCC-AS 122a. In step 617, the received Sh-Notif (SRI received) operation in relation to user 115 is interpreted by the SCC-AS 122a as an indication that the T-ADS function or procedure in relation to UE 115 should be performed. The SCC-AS 122a may perform the T-ADS function as specified in the 3GPP ICS standard. In step 618, on receiving the T-ADS results, the SCC-AS 122a uses the Sh interface towards the second subscriber server 601 by sending an Sh-Notification response operation including the T-ADS result. In step 620, the second subscriber server 601, on reception of the Sh-Notification response message and T-ADS result from SCC-AS 122a, reports the T-ADS result back to subscriber server 154 by sending a MAP NSDM ack message including the T-ADS result. The T-ADS results in relation to UE 115, is stored and used by subscriber server 154 in the enhanced SDS procedure in accordance with the invention.

Referring to FIG. 6c, the signal flow diagram illustrates a further embodiment of a process 630 for use by subscriber server 154 to trigger a T-ADS function when routing the terminating call according to embodiments of the invention. The T-ADS procedures are supported by an SCC-AS 122a deployed in the IMS 108. In this case, the SCC-AS 122a manages a direct MAP interface towards subscriber server 154 using the MAP interface.

In step 632, the subscriber server 154 receives a MAP SRI request or request for routing information from a CS node such as GMSC 136 in relation to a terminating call associated with UE 115. On receiving the SRI message, i.e. MAP_SRI, the subscriber server 154 executes the enhanced SDS procedures according to the invention. The enhanced SDS procedure needs a T-ADS function to be performed or triggered by subscriber server 154. In step 634, subscriber server 154 triggers a T-ADS function to be performed by the SCC-AS 122a by sending a MAP Note_Subscriber_Data_Modified (MAP NSDM) operation directly towards the address of the SCC-AS 122a. The address would be recorded in the subscription information of subscriber server 154 as described with reference to FIGS. 5a to 5c.

In step 635, the SCC-AS 122a may perform the T-ADS function as specified in the 3GPP ICS standard. In step 636, on receiving the T-ADS results, the SCC-AS 122a uses the direct MAP interface towards subscriber server 154 by sending an MAP NSDM ack or MAP_NSDM message including the T-ADS result. The T-ADS results in relation to UE 115 are stored and used by subscriber server 154 in the enhanced SDS procedure in accordance with the invention.

Referring to FIGS. 6a, 6b, and 6c, to implement these new signal flows, the existing MAP NSDM request messages may need to be extended to allow reporting the "SRI-received" notification from subscriber server 154 towards the second subscriber sever 601. In addition, in order to report the T-ADS Results from the second subscriber server 601, in response to the MAP NSDM from subscriber server 154, the second subscriber server 601 sends a MAP NSDM ack message that has been extended to carry the "T-ADS Result" to subscriber server 154. In addition, the existing Sh-Notif request operation may need to be extended to allow reporting of the "SRI-received" notification from the second subscriber server 601 to the SCC-AS 122a. In addition, the responses to Sh_Notif response operation may also need extending to carry the "T-ADS Result" towards the subscriber server 154.

If the received "T-ADS Result" indicates that the terminating call should "continue in the CS domain/network" then the received MAP SRI is processed by subscriber server 154 by sending a MSRN to the GMSC 136 in accordance with the invention. But if the T-ADS result indicates that the GMSC 136 should "route the terminating call towards the IMS 108 for handling", then subscriber server 154 will provide to GMSC 136 an IMRN to force GMSC 136 to route the terminating call in relation to UE 115 towards the IMS through an MGCF (not shown). The IMRN could be generated by subscriber server 154, (e.g. by a prefixing solution) or it may be generated by SCC-AS 122a and carried in the "T-ADS Result" field contained in the received MAP NSDM ack message (or carried in the Sh-Notif response operation).

The SCC-AS 122a can save the result of the applied T-ADS function so it may re-use the T-ADS result in relation to UE 115 when (according to 3GPP ICS standard) the T-ADS function is required to be executed near the end of the terminating SIP INVITE procedure in the IMS 108.

Figure 7B:
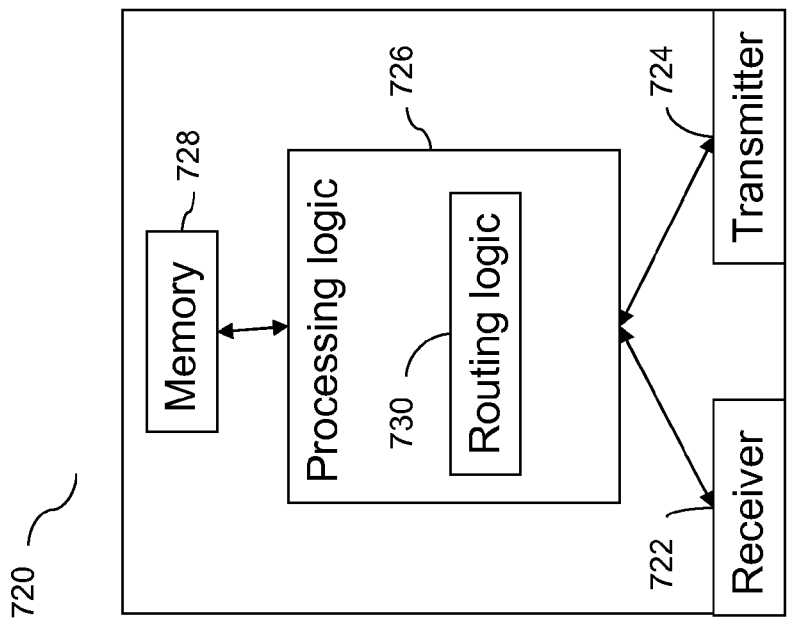
FIG. 7b illustrates schematically a CS node according to embodiments of the invention.
Figure 7A:
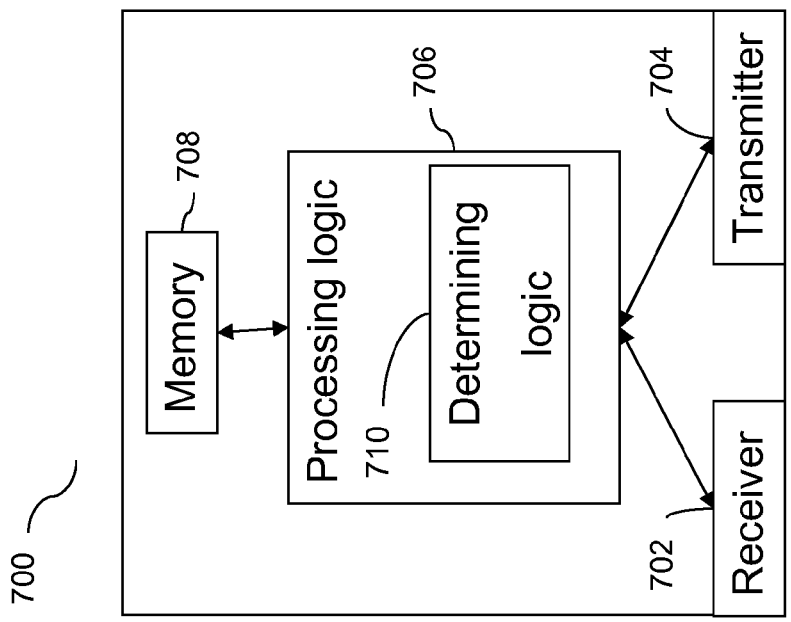
FIG. 7a illustrates schematically a subscriber server according to embodiments of the invention.

FIG. 7a is a schematic illustration of a network node 700 for use in routing a terminating call in the network of FIG. 1c, which includes a CS network, a PS network, and an IP Multimedia Subsystem (IMS). The network node 700 includes a receiver 702, a transmitter 704, processing logic 706, and a memory unit 708. The processing logic 706 is connected to the receiver 702, to the transmitter 704, and to the memory unit 708.

In operation, the receiver 702 is configured to receive a request for routing information in relation to the terminating call from a CS node in the CS network. The processing logic 708 includes determining logic 710 to determine whether a UE associated with the terminating call is registered in the IMS and whether the UE has access to the PS network, the result of which may be stored in memory unit 708. Depending on the result of the determining logic 710, the transmitter 704 is configured to send either a first instruction or a second instruction to the CS node in response to the received request for routing information.

The transmitter 704 is configured for sending a first instruction to the CS node for routing the terminating call in the CS network when the determining logic 710 has determined that the UE is not registered in the IMS or when the UE does not have access to the PS network. Alternatively, the transmitter 704 is further configured for sending a second instruction to the CS node for sending the terminating call to the IMS for handling when the determining logic 710 has determined that UE is registered in the IMS and when the UE has access to the PS network.

In the case when the user associated with the terminating call has multiple UEs within the same subscription in the IMS, then the determining logic 710 is further arranged to determine, for each UE, whether the UE is IMS registered or has access to the PS network, the result of which may be stored in memory unit 708. Based on these results, the determining logic 710 generates a first set of UEs to be served by the CS network and a second set of UEs to be served by the PS network, which is stored in memory unit 708. The transmitter 704 is configured to send the first instruction to the CS node only when the determining logic 710 has determined that there are one or more UEs in the first set of UEs. The transmitter is also configured to send the second instruction to the CS node when the determining logic 710 has determined that there are one or more UEs in the second set of UEs.

FIG. 7b is a schematic illustration of a CS node 720 for use in routing a terminating call in network. The CS node 720 includes a receiver 722, a transmitter 724, a processing logic 726, and a memory unit 728. The processing logic 706 is connected to the receiver 722, to the transmitter 724, and to the memory unit 728.

In operation, the receiver 722 is configured to receive the terminating call associated with a UE. The transmitter 724 is configured for transmitting a request for routing information to subscriber server, or network node 700, in relation to the terminating call. The receiver 722 is further configured for receiving a first instruction from the subscriber server or network node 700. The first instruction relates to routing the terminating call in the CS network when the UE is not registered in the IMS or when the UE does not have access to the PS network. The processing logic 726 comprises routing logic 730 that is configured for routing the terminating call within the CS network, via the transmitter 724, in response to the first instruction.

The receiver 722 is further configured to receive a second instruction from the subscriber server or network node 700. The second instruction relating to sending the terminating call to the IMS for handling when the UE is registered in the IMS and when the UE has access to the PS network. The routing logic 730 is configured for sending, via the transmitter 724, a notification to the IMS to handle the terminating call in response to the second instruction.

In the case when the user associated with the terminating call has multiple UEs within the same subscription in the IMS, then the routing logic 730 is configured to only route the terminating call in the CS network when one or more of the UEs are not registered in the IMS or when one or more of the UEs associated with the terminating call does not have access to the PS network. The routing logic 730 is also configured to only send the notification when one or more of the UEs are registered in the IMS and these UEs have access to the PS network. The processing logic 726 is configured to detect which UE first answers the terminating call, and is configured to send, via the transmitter 724, an instruction to cancel the terminating call for the other UEs in the CS network and/or the PS network via the IMS.

The subscriber server or network node 700 as herein described can include a memory unit 708 and processing logic 706, which can be used for storing and executing a computer program, comprising computer readable code which, when executed by the processing logic 706, causes the network node 700 to perform the relevant methods, procedures, or processes of the invention as described herein. Similarly, the gateway MSC or CS node 720 as herein described can include a memory unit 728 and processing logic 726, which can be used for storing and executing a computer program, comprising computer readable code which, when executed by a processor or processing logic 726, causes the a GMSC or CS node 720 to perform the relevant methods, procedures, or processes of the invention as described herein.

Such computer programs as described herein can be incorporated within one or more computer program products, each comprising a computer readable medium and one or more of the computer programs, where one or more of the computer programs are stored on the computer readable medium.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein. No element, act, or instruction used in the description of the present application should be construed as critical or essential to the invention unless explicitly described as such. Also, as used herein, the article "a" is intended to include one or more items.

The invention claimed is:

1. A method of routing a terminating call in a network comprising a circuit switched, CS, network, a packet switched, PS, network, and an IP Multimedia Subsystem, IMS, the method, performed by a subscriber server, the method comprising:
    receiving a request for routing information in relation to the terminating call from a CS node in the CS network;
    determining whether a user equipment, UE, associated with the terminating call is registered in the IMS and whether the UE has access to the PS network;
    instructing the CS node to route the terminating call in the CS network when the UE is not registered in the IMS or when the UE does not have access to the PS network; and
    instructing the CS node to send the terminating call to the IMS for handling when the UE is registered in the IMS and when the UE has access to the PS network,
    wherein a user associated with the terminating call has multiple UEs within a same subscription in the IMS,
    wherein said determining is performed, for each UE, to generate a first set of UEs to be served by the CS network and a second set of UEs to be served by the PS network,
    wherein instructing the CS node to route the terminating call in the CS network is performed when there are one or more UEs in the first set of UEs,
    wherein instructing the CS node to send the terminating call to the IMS for handling is performed when there are one or more UEs in the second set of UEs, and
    wherein determining whether each UE has access to the PS network further includes confirming that a current access type of each UE is PS access and that each UE has IMS voice over packet switched, VoPS, support.

2. The method according to claim 1, the method further comprising suppressing, for the user associated with the terminating call, IMS call services that are incompatible with CS call services when both the first and second sets of UEs have at least one UE.

3. The method according to claim 1, wherein determining whether the UE has access to the PS network is performed only when the UE is IMS registered.

4. The method according to claim 1, wherein determining whether the UE has access to the PS network further includes querying one or more nodes of the PS network for access information associated with the current access type and IMS VoPS support.

5. The method according to claim 4, wherein querying the one or more nodes of the PS network further includes:
    triggering a second subscriber server in the network to query the one or more nodes of the PS network; and
    receiving the access information sent from the second subscriber server,
    wherein the second subscriber server includes the functionality related to one or more specific functions of a 3GPP compliant subscriber server.

6. The method according to claim 4, wherein querying the one or more nodes of the PS network includes:
    querying the one or more nodes of the PS network having a functionality of a mobility management entity or serving GPRS support node;
    performing a terminating access domain selection, T-ADS, function to retrieve the access information, and
    triggering an IMS node to query the one or more nodes of the PS network, wherein the IMS node includes a functionality of a service centralization and continuity application server, SCC-AS; and
    receiving the access information sent from the IMS node.

7. The method according to claim 6, further comprising:
    receiving a request, sent from the IMS node, for information associated with the UE's current access to the packet switched network; and
    retrieving and transmitting the information towards the IMS node.

8. The method according to claim 1, further comprising:
    receiving, from the IMS, IMS status information associated with the UE when the UE registers within the IMS; and
    using the received IMS status information in the step of determining whether the UE is IMS registered,
    wherein receiving the IMS status information includes receiving the IMS status information from a second IMS node including a functionality of an SCC-AS node or from a third subscriber server including the functionality related to one or more specific functions of a 3GPP compliant subscriber server.

9. The method according to claim 1, wherein:
    instructing the CS node to route the terminating call further includes sending a mobile station roaming number, MSRN, to the CS node; and
    instructing the CS node to send the terminating call further includes sending an IP Multimedia Routing Number, IMRN, to the CS node.

10. The method according to claim 1, wherein the determining is performed prior to the terminating call being sent to the IMS for handling.

11. A method for routing a terminating call in a network comprising a circuit switched, CS, network, a packet switched, PS, network, and an IP Multimedia Subsystem, IMS, the method, performed by a CS node in the CS network, the method comprising:
    receiving the terminating call associated with a user equipment, UE;
    transmitting a request for routing information to a subscriber server in relation to the terminating call;
    receiving a first instruction from the subscriber server to route the terminating call in the CS network when the UE is not registered in the IMS or when the UE does not have access to the PS network, and, in response, routing the terminating call in the CS network; and
    receiving a second instruction from the subscriber server to send the terminating call to the IMS for handling when the UE is registered in the IMS and when the UE has access to the PS network, and, in response, sending a notification to the IMS to handle the terminating call,
    wherein a user associated with the terminating call has multiple UEs within a same subscription in the IMS,
    wherein receiving the first instruction and routing the terminating call in the CS network is performed when one or more of the UEs are not registered in the IMS or when one or more of the UEs associated with the terminating call do not have access to the PS network, and
    wherein receiving the second instruction and sending the notification to the IMS for handling the terminating call is performed when one or more of the UEs are registered in the IMS and these UEs have access to the PS network.

12. The method according to claim 11, the method further comprising detecting which UE first answers the terminating call and instructing the CS network or the PS network, via the IMS, to cancel the terminating call for the other UEs.

13. The method according to claim 11, the method further comprising instructing the IMS or the subscriber server which call services of the user associated with the terminating call will be executed by the CS node.

14. The method according to claim 11, wherein the second instruction is received prior to the terminating call being sent to the NS for handling.

15. A network node for routing a terminating call in a network comprising a circuit switched, CS, network, a packet switched, PS, network, and an IP Multimedia Subsystem, IMS, the network node comprising:
    a receiver, a transmitter, a memory unit, and processing logic, the processing logic being connected to the receiver, to the transmitter, and to the memory unit wherein:
    the receiver is configured for receiving a request for routing information in relation to the terminating call from a CS in the CS network;
    the processing logic comprises determining logic to determine whether a user equipment, UE, associated with the terminating call is registered in the IMS and whether the UE has access to the PS network;
    the transmitter is configured for sending a first instruction to the CS node for routing the terminating call in the CS network when the UE is not registered in the IMS or when the UE does not have access to the PS network; and
    the transmitter is further configured for sending a second instruction to the CS node for sending the terminating call to the IMS for handling when the UE is registered in the IMS and when the UE has access to the PS network,
    wherein a user associated with the terminating call has multiple UEs within a same subscription in the IMS,
    wherein the determining logic is arranged to determine, for each UE, whether the UE is IMS registered or has access to the PS network and to generate a first set of UEs to be served by the CS network and a second set of UEs to be served by the PS network,
    wherein the determining logic is further arranged to confirm that a current access type of each UE is PS access and that each UE has IMS voice over packet switched, VoPS, support,
    wherein the transmitter is configured to send the first instruction to the CS node only when there are one or more UEs in the first set of UEs, and
    wherein the transmitter is configured to send the second instruction to the CS node when there are one or more UEs in the second set of UEs.

16. The network node of claim 15, wherein determining whether the UE associated with the terminating call is registered in the IMS and whether the UE has access to the PS network is performed prior to the terminating call being sent to the IMS for handling.

17. A circuit switched, CS, node for routing a terminating call in a network comprising a CS network, a packet switched, PS, network, and an IP Multimedia Subsystem, IMS, the CS node comprising:
    a receiver, a transmitter, a memory unit, and processing logic, the processing logic being connected to the receiver, to the transmitter, and to the memory unit wherein:
    the receiver is configured for receiving the terminating call associated with a user equipment, UE;
    the transmitter is configured for transmitting a request for routing information to a subscriber server in relation to the terminating call;
    the receiver is further configured for receiving a first instruction from the subscriber server to route the terminating call in the CS network when the UE is not registered in the IMS or when the UE does not have access to the PS network;
    the processing logic comprises routing logic configured for routing the terminating call within the CS network, via the transmitter, in response to the first instruction;
    the receiver is further configured to receive a second instruction from the subscriber server to send the terminating call to the IMS for handling when the UE is registered in the IMS and when the UE has access to the PS network; and
    the routing logic is configured for sending, via the transmitter, a notification to the IMS to handle the terminating call in response to the second instruction,
    wherein a user associated with the terminating call has multiple UEs within a same subscription in the IMS,
    wherein the routing logic is configured to only route the terminating call in the CS network when one or more of the UEs are not registered in the IMS or when one or more of the UEs associated with the terminating call does not have access to the PS network, and wherein the routing logic is configured to only send the notification when one or more of the UEs are registered in the IMS and these UEs have access to the PS network.

18. The CS node according to claim 17, wherein the processing logic is configured to detect which UE first answers the terminating call, and the processing logic is further configured to send, via the transmitter, an instruction to cancel the terminating call for the other UEs in the CS network and/or the PS network via the IMS.

19. The CS node of claim 17, wherein the second instruction is received from the subscriber server prior to the terminating call being sent to the IMS for handling.

* * * * *